United States Patent
Cai et al.

(10) Patent No.: US 11,895,522 B2
(45) Date of Patent: Feb. 6, 2024

(54) INTERFERENCE CANCELLATION METHOD, DEVICE, AND SYSTEM

(71) Applicant: HUAWEI TECHNOLOGIES CO., LTD., Shenzhen (CN)

(72) Inventors: Meng Cai, Chengdu (CN); Kun Li, Chengdu (CN); Jiantao Ma, Chengdu (CN); Ping Cao, Chengdu (CN); Hongli Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 434 days.

(21) Appl. No.: 17/313,531

(22) Filed: May 6, 2021

(65) Prior Publication Data
US 2021/0258816 A1    Aug. 19, 2021

Related U.S. Application Data

(63) Continuation of application No. PCT/CN2018/114640, filed on Nov. 8, 2018.

(51) Int. Cl.
H04W 24/10 (2009.01)
H04B 17/336 (2015.01)
H04L 5/00 (2006.01)

(52) U.S. Cl.
CPC .......... *H04W 24/10* (2013.01); *H04B 17/336* (2015.01); *H04L 5/0048* (2013.01)

(58) Field of Classification Search
None
See application file for complete search history.

(56) References Cited

U.S. PATENT DOCUMENTS

| 6,384,858 B1 * | 5/2002 | Limberg | H04N 5/211 |
| | | | 375/350 |
| 8,594,253 B2 * | 11/2013 | Breems | H03M 1/0836 |
| | | | 375/346 |

(Continued)

FOREIGN PATENT DOCUMENTS

| CN | 103685098 A | 3/2014 |
| CN | 103856423 A | 6/2014 |

(Continued)

OTHER PUBLICATIONS

Zhang Zhongshan et al: "Full-Duplex Wireless Communications: Challenges, Solutions, and Future Research Directions", Jul. 1, 2016, pp. 1369-1409, XP011614401,total 41 pages.

*Primary Examiner* — Phirin Sam
(74) *Attorney, Agent, or Firm* — Rimon PC

(57) ABSTRACT

A method includes: A first device sends a first signal to a second device, where the first signal includes a first transmit signal and a first pilot signal; the first device obtains a second signal, where the second signal includes a first self-interference signal, a second pilot signal, and a second receive signal from the second device; the first device extracts jitter information of the first self-interference signal based on the first pilot signal and the second pilot signal; the first device reconstructs a self-interference signal based on the first transmit signal and the jitter information of the first self-interference signal, to obtain a cancellation signal of the first self-interference signal; and the first device cancels the first self-interference signal from the second receive signal based on the cancellation signal of the first self-interference signal.

20 Claims, 20 Drawing Sheets

(56) References Cited

U.S. PATENT DOCUMENTS

| | | | |
|---|---|---|---|
| 10,374,781 B2 * | 8/2019 | Khandani | ............... H04B 1/56 |
| 2013/0286903 A1 | 10/2013 | Khojastepour et al. | |
| 2016/0277166 A1 | 9/2016 | Liu | |
| 2018/0249472 A1 | 8/2018 | Liu et al. | |

FOREIGN PATENT DOCUMENTS

| | | | |
|---|---|---|---|
| CN | 103973349 A | 8/2014 | |
| CN | 104185186 A | 12/2014 | |
| CN | 104852752 A | 8/2015 | |
| CN | 105450559 A | 3/2016 | |
| CN | 106134095 A | 11/2016 | |
| CN | 106411337 A | 2/2017 | |
| CN | 106453171 A | 2/2017 | |
| CN | 107453782 A | 12/2017 | |
| EP | 3065439 A1 | 9/2016 | |
| EP | 3355610 A1 | 8/2018 | |
| WO | 2013074213 A1 | 5/2013 | |
| WO | 2015080769 A1 | 6/2015 | |

* cited by examiner

TO FIG. 6B

INTERFERENCE CANCELLATION METHOD, DEVICE, AND SYSTEM

CROSS-REFERENCE TO RELATED APPLICATIONS

This application is a continuation of International Patent Application No. PCT/CN2018/114640, filed on Nov. 8, 2018, the disclosure of which is hereby incorporated by reference in its entirety.

TECHNICAL FIELD

This application relates to the field of microwave technologies, and in particular, to an interference cancellation method, a device, and a system.

BACKGROUND

As shown in FIG. 1, an existing microwave architecture mainly uses a split architecture. That is, an outdoor unit (ODU) is separated from an indoor unit (IDU), and a signal is transmitted between the ODU and the IDU by an intermediate frequency cable. As mobile bearer bandwidth requirements increase, a microwave bandwidth also increases. For example, the microwave bandwidth needs to be accelerated from 56 MHz to 500 MHz. To maintain a cost advantage and maintain that still one intermediate frequency cable is used between the ODU and the IDU for connection, a transmission bandwidth of the intermediate frequency cable (may also be referred to as an intermediate frequency bandwidth for short) needs to be accelerated. In other words, increasing the transmission bandwidth of the intermediate frequency cable is one of key technologies for continuous evolution of the split microwave architecture. However, as the transmission bandwidth of the intermediate frequency cable increases, attenuation of the intermediate frequency cable also increases. In addition, the intermediate frequency cable suffers interference from radio frequency bands such as a frequency band used by a global system for mobile communications (GSM)/long term evolution (LTE). Therefore, the foregoing problem needs to be resolved when the transmission bandwidth of the intermediate frequency cable is accelerated.

To resolve the foregoing problem, in the conventional technology, the transmission bandwidth of the intermediate frequency cable is accelerated currently in a frequency-division duplexing (FDD) manner. For example, as shown in FIG. 2, assuming that a GSM/LTE interfering frequency considered is about 700 MHz to 900 MHz, a receive signal (RX) and a transmit signal (TX) may be separately located on two sides of the GSM/LTE interfering frequency. The receive signal (RX) uses a low frequency, and the transmit signal (TX) uses a high frequency.

However, the foregoing solution has problems of low spectral efficiency and a limited transmission bandwidth of the intermediate frequency cable. How to overcome the foregoing problem when the transmission bandwidth of the intermediate frequency cable is accelerated is an urgent problem to be resolved at present.

SUMMARY

Embodiments of this application provide an interference cancellation method, a device, and a system, which cannot only overcome problems of low spectral efficiency and a limited transmission bandwidth of an intermediate frequency cable when the transmission bandwidth of the intermediate frequency cable is accelerated, but also cancel a first self-interference signal generated therefrom. Cancellation herein may be partial or complete cancellation. This is described herein in a unified manner, and this is not specifically limited in the embodiments of this application.

To achieve the foregoing objective, the following technical solutions are used in the embodiments of this application.

According to a first aspect, an interference cancellation method is provided. The method includes: A first device sends a first signal to a second device, where the first signal includes a first transmit signal and a first pilot signal, a first self-interference signal is generated from the first transmit signal and is sent to a receive end of the first device (sometimes stated herein as generating the first self-interference signal to the receive end of the first device), and the first transmit signal and the first pilot signal use different frequency bands; the first device obtains a second signal, where the second signal includes the first self-interference signal, a second pilot signal, and a second receive signal from the second device, the second pilot signal is a pilot signal obtained after the first pilot signal undergoes a channel jitter, frequency bands used by the first transmit signal and the second receive signal completely or partially overlap, and the second receive signal and the second pilot signal use different frequency bands; the first device extracts jitter information of the first self-interference signal based on the first pilot signal and the second pilot signal; the first device reconstructs a self-interference signal based on the first transmit signal and the jitter information of the first self-interference signal, to obtain a cancellation signal of the first self-interference signal; and the first device cancels the first self-interference signal from the second receive signal based on the cancellation signal of the first self-interference signal. Based on the interference cancellation method provided in this embodiment of this application, in one aspect, because uplink and downlink frequency bands corresponding to receive and transmit signals (that is, a receive signal and a transmit signal) may completely or partially overlap, spectral efficiency can be improved, and a transmission bandwidth of an intermediate frequency cable can be increased. In another aspect, because uplink and downlink frequency bands corresponding to receive and transmit signals may completely or partially overlap, both receive and transmit signals in the solutions in the present invention may use a lower frequency. Therefore, a cable transmission loss is comparatively small, thereby reducing an insertion loss and improving cable shielding performance and port standing-wave performance. In still another aspect, because uplink and downlink frequency bands corresponding to receive and transmit signals may completely or partially overlap, the first transmit signal may generate the first self-interference signal to the receive end of the first device. However, the first device may obtain cancellation information of the first self-interference signal, and cancel, based on the cancellation signal of the first self-interference signal, the first self-interference signal from the second receive signal that is from the second device. Therefore, the first self-interference signal generated therefrom can be reduced.

In a possible design, that the first device reconstructs a self-interference signal based on the first transmit signal and the jitter information of the first self-interference signal includes: The first device reconstructs a near-end interference signal based on the first transmit signal and the jitter information of the first self-interference signal, where the near-end interference signal includes a near-end reflected interference signal and a near-end transmit-receive isolated interference signal. To be specific, based on the interference cancellation method provided in this embodiment of this application, the near-end interference signal can be reconstructed, so that the near-end interference signal can be cancelled.

In a possible design, that the first device reconstructs a self-interference signal based on the first transmit signal and the jitter information of the first self-interference signal includes: The first device determines that X far-end reflected interference signal cancellations need to be performed, where X is a positive integer; and the first device reconstructs, based on the first transmit signal and the jitter information of the first self-interference signal, a near-end interference signal, and an interference signal resulting from the first far-end reflection to an interference signal resulting from an $X^{th}$ far-end reflection, where the near-end interference signal includes a near-end reflected interference signal and a near-end transmit-receive isolated interference signal. To be specific, based on the interference cancellation method provided in this embodiment of this application, not only the near-end interference signal can be reconstructed so that the near-end interference signal can be cancelled, but also the interference signals resulting from the X far-end reflections can be reconstructed so that the interference signals resulting from the X far-end reflections can be cancelled.

In a possible design, that the first device reconstructs, based on the first transmit signal and the jitter information of the first self-interference signal, an interference signal resulting from the first far-end reflection to an interference signal resulting from an $X^{th}$ far-end reflection includes: The first device reconstructs, based on the first transmit signal and the jitter information of the first self-interference signal and with reference to X delay parameters, the interference signal resulting from the first far-end reflection to the interference signal resulting from the $X^{th}$ far-end reflection, where an $f^{th}$ delay parameter in the X delay parameters is used for reconstruction of an interference signal resulting from an $f^{th}$ far-end reflection in the interference signal resulting from the first far-end reflection to the interference signal resulting from the $X^{th}$ far-end reflection, and f is a positive integer greater than or equal to 1. To be specific, in the solutions provided in this embodiment of this application, the interference signal resulting from the $f^{th}$ far-end reflection is reconstructed with reference to the $f^{th}$ delay parameter. In other words, according to the interference cancellation method provided in this embodiment of this application, during reconstruction of the far-end reflected interference signals, a factor of a delay between each far-end reflected interference signal and the near-end interference signal is considered, so that the reconstructed first self-interference signal can be closer to the actual first self-interference signal, and a more accurate cancellation signal of the first self-interference signal can be obtained.

In a possible design, that the first device determines that X far-end reflected interference signal cancellations need to be performed includes: The first device obtains a $k^{th}$ delay parameter and a $(k+1)^{th}$ delay parameter, where the $k^{th}$ delay parameter is a delay parameter of an interference signal resulting from a $k^{th}$ far-end reflection, the $(k+1)^{th}$ delay parameter is a delay parameter of an interference signal resulting from a $(k+1)^{th}$ far-end reflection, and k is a positive integer greater than or equal to 1; the first device determines, based on the $k^{th}$ delay parameter and the $(k+1)^{th}$ delay parameter, a length of an intermediate frequency cable that connects the first device and the second device; and the first device determines, based on the length of the intermediate frequency cable, that the X far-end reflected interference signal cancellations need to be performed. Based on the interference cancellation method provided in this embodiment of this application, the first device can determine that the X far-end reflected interference signal cancellations need to be performed.

In a possible design, that the first device determines, based on the length of the intermediate frequency cable, that X far-end reflected interference signal cancellations need to be performed includes: The first device determines, based on the length of the intermediate frequency cable, one or more thresholds corresponding to a case in which a cancellation demand of the first self-interference signal is 0 dB; and if the length of the intermediate frequency cable is not greater than a first threshold, the first device determines that the X far-end reflected interference signal cancellations need to be performed, where X is a quantity of all current far-end reflected interference signal reconstruction links, and the first threshold is a minimum threshold in the one or more thresholds; if the length of the intermediate frequency cable is not less than a second threshold, the first device determines that one far-end reflected interference signal cancellation needs to be performed, where the second threshold is a maximum threshold in the one or more thresholds; or if the length of the intermediate frequency cable is greater than a third threshold and less than a fourth threshold, the first device determines that the X far-end reflected interference signal cancellations need to be performed, where the third threshold is an $X^{th}$ threshold obtained after the one or more thresholds are sorted in descending order, the fourth threshold is an $(X-1)^{th}$ threshold obtained after the one or more thresholds are sorted in descending order, and X is a positive integer greater than or equal to 2. Based on the interference cancellation method provided in this embodiment of this application, the first device can determine, based on the length of the intermediate frequency cable, a quantity of far-end reflected interference signal cancellations that need to be performed.

In a possible design, that the first device obtains a $t^{th}$ delay parameter, where t=k or t=k+1 includes: The first device adjusts a delay parameter corresponding to a $t^{th}$ delay module, and determines, as the $t^{th}$ delay parameter, a delay parameter corresponding to a maximum minimum mean square error MSE of the received second receive signal. Based on the interference cancellation method provided in this embodiment of this application, the first device can obtain the $t^{th}$ delay parameter.

In a possible design, that the first device reconstructs a near-end interference signal includes: The first device reconstructs the near-end interference signal by using a near-end interference signal reconstruction link.

In a possible design, that the first device reconstructs an interference signal resulting from the first far-end reflection to an interference signal resulting from an $X^{th}$ far-end reflection includes: The first device reconstructs, by using X far-end reflected interference signal reconstruction links, the interference signal resulting from the first far-end reflection to the interference signal resulting from the $X^{th}$ far-end reflection, where a $y^{th}$ far-end reflected interference signal reconstruction link in the X far-end reflected interference signal reconstruction links is used for reconstruction of an interference signal resulting from the $y^{th}$ far-end reflection, and y is a positive integer less than or equal to X.

In a possible design, that the first device extracts jitter information of the first self-interference signal based on the first pilot signal and the second pilot signal includes: The first device converts the second pilot signal into a narrow-band pilot signal; and the first device extracts the jitter information of the first self-interference signal from the narrowband pilot signal based on the first pilot signal. Based on the interference cancellation method provided in this embodiment of this application, the first device can extract the jitter information of the first self-interference signal.

In a possible design, that the first device extracts jitter information of the first self-interference signal based on the first pilot signal and the second pilot signal includes: The first device converts the second pilot signal into a monophonic pilot signal; and the first device extracts the jitter information of the first self-interference signal from the monophonic pilot signal based on the first pilot signal. Based on the interference cancellation method provided in this embodiment of this application, the first device can extract the jitter information of the first self-interference signal.

In a possible design, the jitter information of the first self-interference signal includes at least one of phase jitter information of the first self-interference signal or amplitude jitter information of the first self-interference signal.

In a possible design, the first transmit signal includes a first carrier signal and a second carrier signal, and a center frequency of the second carrier signal is higher than a global system for mobile communications GSM/long term evolution LTE interfering frequency; the second carrier signal generates self-interference noise to the receive end of the first device; correspondingly, the second signal further includes the self-interference noise; and the method further includes: The first device reconstructs self-interference noise based on the first transmit signal and a second interference cancellation error reference value, to obtain a cancellation signal of the self-interference noise; and the first device cancels the self-interference noise from the second receive signal based on the cancellation signal of the self-interference noise. Based on the interference cancellation method provided in this embodiment of this application, the self-interference noise in the second carrier signal can be cancelled, thereby improving a signal-to-noise ratio of a wanted signal in the second carrier signal.

In a possible design, that the first device reconstructs self-interference noise based on the first transmit signal and the second interference cancellation error reference value, to obtain a cancellation signal of the self-interference noise includes: The first device determines, based on the second interference cancellation error reference value, a reconstruction parameter used for reconstruction of analog self-interference noise; and the first device reconstructs the analog self-interference noise based on the reconstruction parameter and the first transmit signal, to obtain an analog cancellation signal of the self-interference noise. Correspondingly, that the first device cancels the self-interference noise from the second receive signal based on the cancellation signal of the self-interference noise includes: The first device cancels the self-interference noise from the second receive signal based on the analog cancellation signal of the self-interference noise.

In a possible design, that the first device reconstructs self-interference noise based on the first transmit signal and the second interference cancellation error reference value, to obtain a cancellation signal of the self-interference noise includes: The first device reconstructs digital self-interference noise based on the first transmit signal and the second interference cancellation error reference value, to obtain a digital cancellation signal of the self-interference noise. Correspondingly, that the first device cancels the self-interference noise from the second receive signal based on the cancellation signal of the self-interference noise includes: The first device cancels the self-interference noise from the second receive signal based on the digital cancellation signal of the self-interference noise.

In a possible design, that the first transmit signal generates a first self-interference signal to a receive end of the first device includes: The first transmit signal generates a second self-interference signal to the receive end of the first device, where the second self-interference signal includes the first self-interference signal. That the first device obtains a second signal includes: The first device obtains a third signal, where the third signal includes the second pilot signal, the second receive signal, and the second self-interference signal; the first device reconstructs a self-interference signal based on the first transmit signal and a third interference cancellation error reference value, to obtain a cancellation signal of the second self-interference signal; and the first device cancels the second self-interference signal from the second receive signal based on the cancellation signal of the second self-interference signal, to obtain the second signal. When a transmission distance of an intermediate frequency cable is comparatively long, or a transmitted signal has a larger bandwidth (for example, a special shield layer is used to resolve GSM/LTE interference, so that the interference does not need to be avoided, and a larger bandwidth can be transmitted), a power of a receive signal is comparatively low. In this case, based on the interference cancellation method provided in this embodiment of this application, before obtaining the second signal, the first device can perform interference signal cancellation once, thereby improving a signal to interference plus noise ratio of the second receive signal received by the first device from the second device.

In a possible design, that the first device reconstructs a self-interference signal based on the first transmit signal and a third interference cancellation error reference value, to obtain a cancellation signal of the second self-interference signal includes: The first device reconstructs a digital self-interference signal based on the first transmit signal and the third interference cancellation error reference value, to obtain a digital cancellation signal of the second self-interference signal; and the first device converts the digital cancellation signal of the second self-interference signal into an analog cancellation signal of the second self-interference signal. Correspondingly, that the first device cancels the second self-interference signal from the second receive signal based on the cancellation signal of the second self-interference signal, to obtain the second signal includes: The first device cancels the second self-interference signal from the second receive signal based on the analog cancellation signal of the second self-interference signal, to obtain an analog signal corresponding to the second signal; and the first device converts the analog signal corresponding to the second signal into the second signal by using an ADC. Based on the interference cancellation method provided in this embodiment of this application, the first device can obtain the second signal.

In a possible design, the first device is an indoor unit IDU, and the second device is an outdoor unit ODU; or the first device is an ODU, and the second device is an IDU.

According to a second aspect, a first device is provided. The first device includes a multiplexer, a jitter extraction submodule, a first interference reconstruction submodule, and a first interference cancellation submodule. The multiplexer is configured to: obtain a first transmit signal and a first pilot signal, multiplex the first transmit signal and the first pilot signal into a first signal, and send the first signal to a second device, where the first transmit signal generates a first self-interference signal to a receive end of the first device, and the first transmit signal and the first pilot signal use different frequency bands. The jitter extraction submodule is configured to obtain the first pilot signal and a second signal, where the second signal includes the first self-interference signal, a second pilot signal, and a second receive signal from the second device, the second pilot signal is a pilot signal obtained after the first pilot signal undergoes a channel jitter, frequency bands used by the first transmit signal and the second receive signal completely or partially overlap, and the second receive signal and the second pilot signal use different frequency bands. The jitter extraction submodule is further configured to extract jitter information of the first self-interference signal based on the first pilot signal and the second pilot signal. The first interference reconstruction submodule is configured to: obtain the first transmit signal and the jitter information of the first self-interference signal, and reconstruct a self-interference signal based on the first transmit signal and the jitter information of the first self-interference signal, to obtain a cancellation signal of the first self-interference signal. The first interference cancellation submodule is configured to: obtain the second signal and the cancellation signal of the first self-interference signal, and cancel the first self-interference signal from the second receive signal based on the cancellation signal of the first self-interference signal. Based on the first device provided in this embodiment of this application, in one aspect, because uplink and downlink frequency bands corresponding to receive and transmit signals (that is, a receive signal and a transmit signal) may completely or partially overlap, spectral efficiency can be improved, and a transmission bandwidth of an intermediate frequency cable can be increased. In another aspect, because uplink and downlink frequency bands corresponding to receive and transmit signals may completely or partially overlap, both receive and transmit signals in the solutions in the present invention may use a lower frequency. Therefore, a cable transmission loss is comparatively small, thereby reducing an insertion loss and improving cable shielding performance and port standing-wave performance. In still another aspect, because uplink and downlink frequency bands corresponding to receive and transmit signals may completely or partially overlap, the first transmit signal may generate the first self-interference signal to the receive end of the first device. However, the first device may obtain cancellation information of the first self-interference signal, and cancel, based on the cancellation signal of the first self-interference signal, the first self-interference signal from the second receive signal that is from the second device. Therefore, the first self-interference signal generated therefrom can be reduced.

In a possible design, the first interference reconstruction submodule is specifically configured to: reconstruct a near-end interference signal based on the first transmit signal and the jitter information of the first self-interference signal, where the near-end interference signal includes a near-end reflected interference signal and a near-end transmit-receive isolated interference signal. To be specific, based on the first device provided in this embodiment of this application, the near-end interference signal can be reconstructed, so that the near-end interference signal can be cancelled.

In a possible design, the first interference reconstruction submodule is specifically configured to: determine that X far-end reflected interference signal cancellations need to be performed, where X is a positive integer; and reconstruct, based on the first transmit signal and the jitter information of the first self-interference signal, a near-end interference signal, and an interference signal resulting from the first far-end reflection to an interference signal resulting from an $X^{th}$ far-end reflection, where the near-end interference signal includes a near-end reflected interference signal and a near-end transmit-receive isolated interference signal. To be specific, based on the first device provided in this embodiment of this application, not only the near-end interference signal can be reconstructed so that the near-end interference signal can be cancelled, but also the interference signals resulting from the X far-end reflections can be reconstructed so that the interference signals resulting from the X far-end reflections can be cancelled.

In a possible design, that the first interference reconstruction submodule is configured to reconstruct, based on the first transmit signal and the jitter information of the first self-interference signal, the interference signal resulting from the first far-end reflection to the interference signal resulting from the $X^{th}$ far-end reflection includes: reconstructing, based on the first transmit signal and the jitter information of the first self-interference signal and with reference to X delay parameters, the interference signal resulting from the first far-end reflection to the interference signal resulting from the $X^{th}$ far-end reflection, where an $f^{th}$ delay parameter in the X delay parameters is used for reconstruction of an interference signal resulting from an $f^{th}$ far-end reflection in the interference signal resulting from the first far-end reflection to the interference signal resulting from the $X^{th}$ far-end reflection, and f is a positive integer greater than or equal to 1. To be specific, in the solutions provided in this embodiment of this application, the interference signal resulting from the $f^{th}$ far-end reflection is reconstructed with reference to the $f^{th}$ delay parameter. In other words, according to the first device provided in this embodiment of this application, during reconstruction of the far-end reflected interference signals, a factor of a delay between each far-end reflected interference signal and the near-end interference signal is considered, so that the reconstructed first self-interference signal can be closer to the actual first self-interference signal, and a more accurate cancellation signal of the first self-interference signal can be obtained.

In a possible design, that the first interference reconstruction submodule is configured to determine that the X far-end reflected interference signal cancellations need to be performed includes: obtaining a $k^{th}$ delay parameter and a $(k+1)^{th}$ delay parameter, where the $k^{th}$ delay parameter is a delay parameter of an interference signal resulting from a $k^{th}$ far-end reflection, the $(k+1)^{th}$ delay parameter is a delay parameter of an interference signal resulting from a $(k+1)^{th}$ far-end reflection, and k is a positive integer greater than or equal to 1; determining, based on the $k^{th}$ delay parameter and the $(k+1)^{th}$ delay parameter, a length of an intermediate frequency cable that connects the first device and the second device; and determining, based on the length of the intermediate frequency cable, that the X far-end reflected interference signal cancellations need to be performed. Based on the solutions, the first device can determine that the X far-end reflected interference signal cancellations need to be performed.

In a possible design, that the first interference reconstruction submodule is configured to determine, based on the length of the intermediate frequency cable, that the X far-end reflected interference signal cancellations need to be performed includes: determining, based on the length of the intermediate frequency cable, one or more thresholds corresponding to a case in which a cancellation demand of the first self-interference signal is 0 dB; and if the length of the intermediate frequency cable is not greater than a first threshold, determining that the X far-end reflected interference signal cancellations need to be performed, where X is a quantity of all current far-end reflected interference signal reconstruction links, and the first threshold is a minimum threshold in the one or more thresholds; if the length of the intermediate frequency cable is not less than a second threshold, determining that one far-end reflected interference signal cancellation needs to be performed, where the second threshold is a maximum threshold in the one or more thresholds; or if the length of the intermediate frequency cable is greater than a third threshold and less than a fourth threshold, determining that the X far-end reflected interference signal cancellations need to be performed, where the third threshold is an $X^{th}$ threshold obtained after the one or more thresholds are sorted in descending order, the fourth threshold is an $(X-1)^{th}$ threshold obtained after the one or more thresholds are sorted in descending order, and X is a positive integer greater than or equal to 2. Based on the solutions provided in this embodiment of this application, the first device can determine, based on the length of the intermediate frequency cable, a quantity of far-end reflected interference signal cancellations that need to be performed.

In a possible design, that the first interference reconstruction submodule is configured to obtain a $t^{th}$ delay parameter, where t=k or t=k+1 includes: adjusting a delay parameter corresponding to a $t^{th}$ delay module, and determining, as the $t^{th}$ delay parameter, a delay parameter corresponding to a maximum minimum mean square error MSE of the received second receive signal. Based on the solutions provided in this embodiment of this application, the first device can obtain the $t^{th}$ delay parameter.

In a possible design, that the first interference reconstruction submodule is configured to reconstruct the near-end interference signal includes: reconstructing the near-end interference signal by using a near-end interference signal reconstruction link.

In a possible design, that the first interference reconstruction submodule is configured to reconstruct the interference signal resulting from the first far-end reflection to the interference signal resulting from the $X^{th}$ far-end reflection includes: reconstructing, by using X far-end reflected interference signal reconstruction links, the interference signal resulting from the first far-end reflection to the interference signal resulting from the $X^{th}$ far-end reflection, where a $y^{th}$ far-end reflected interference signal reconstruction link in the X far-end reflected interference signal reconstruction links is used for reconstruction of an interference signal resulting from the $y^{th}$ far-end reflection, and y is a positive integer less than or equal to X.

In a possible design, the jitter extraction submodule is specifically configured to: convert the second signal into a narrowband pilot signal; and extract the jitter information of the first self-interference signal from the narrowband pilot signal based on the first pilot signal. Based on the solutions provided in this embodiment of this application, the first device can extract the jitter information of the first self-interference signal.

In a possible design, the jitter extraction submodule is specifically configured to: convert the second signal into a monophonic pilot signal; and extract the jitter information of the first self-interference signal from the monophonic pilot signal based on the first pilot signal. Based on the solutions provided in this embodiment of this application, the first device can extract the jitter information of the first self-interference signal.

In a possible design, the jitter information of the first self-interference signal includes at least one of phase jitter information of the first self-interference signal or amplitude jitter information of the first self-interference signal.

In a possible design, the first transmit signal includes a first carrier signal and a second carrier signal, and a center frequency of the second carrier signal is higher than a global system for mobile communications GSM/long term evolution LTE interfering frequency; the second carrier signal generates self-interference noise to the receive end of the first device; correspondingly, the second signal further includes the self-interference noise; and the first device further includes a second interference reconstruction submodule and a second interference cancellation submodule. The second interference reconstruction submodule is configured to reconstruct self-interference noise based on the first transmit signal and a second interference cancellation error reference value, to obtain a cancellation signal of the self-interference noise. The second interference cancellation submodule is configured to: obtain the second signal and the cancellation signal of the self-interference noise, and cancel the self-interference noise from the second receive signal based on the cancellation signal of the self-interference noise.

In a possible design, the second interference reconstruction submodule is specifically configured to: determine, based on the second interference cancellation error reference value, a reconstruction parameter used for reconstruction of analog self-interference noise; and reconstruct the analog self-interference noise based on the reconstruction parameter and the first transmit signal, to obtain an analog cancellation signal of the self-interference noise. Correspondingly, the second interference cancellation submodule is specifically configured to: obtain the second signal and the analog cancellation signal of the self-interference noise, and cancel the self-interference noise from the second receive signal based on the analog cancellation signal of the self-interference noise. Based on the solutions, the self-interference noise in the second carrier signal can be cancelled, thereby improving a signal-to-noise ratio of a wanted signal in the second carrier signal.

In a possible design, the second interference reconstruction submodule is specifically configured to: reconstruct digital self-interference noise based on the first transmit signal and the second interference cancellation error reference value, to obtain a digital cancellation signal of the self-interference noise. Correspondingly, the second interference cancellation submodule is specifically configured to: obtain the second signal and the digital cancellation signal of the self-interference noise, and cancel the self-interference noise from the second receive signal based on the digital cancellation signal of the self-interference noise.

In a possible design, the first device further includes a third interference reconstruction submodule and a third interference cancellation submodule. That the first transmit signal generates a first self-interference signal to a receive end of the first device includes: The first transmit signal generates a second self-interference signal to the receive end of the first device, where the second self-interference signal includes the first self-interference signal. The third interference reconstruction submodule is configured to: obtain the first transmit signal, and reconstruct a self-interference signal based on the first transmit signal and a third interference cancellation error reference value, to obtain a cancellation signal of the second self-interference signal. The third interference cancellation submodule is configured to: obtain a third signal and the cancellation signal of the second self-interference signal, where the third signal includes the second pilot signal, the second receive signal, and the second self-interference signal; and cancel the second self-interference signal from the second receive signal based on the cancellation signal of the second self-interference signal, to obtain the second signal. Correspondingly, that the jitter extraction submodule is configured to obtain the second signal includes: The jitter extraction submodule is configured to receive the second signal that is from the third interference cancellation submodule. Based on the solutions provided in this embodiment of this application, before obtaining the second signal, the first device can perform interference signal cancellation once, thereby improving a signal to interference plus noise ratio of the second receive signal in the second signal received by the first device.

In a possible design, the first device further includes an analog-to-digital converter ADC. That the third interference reconstruction submodule is configured to reconstruct a self-interference signal based on the first transmit signal and a third interference cancellation error reference value, to obtain a cancellation signal of the second self-interference signal includes: reconstructing a digital self-interference signal based on the first transmit signal and the third interference cancellation error reference value, to obtain a digital cancellation signal of the second self-interference signal; and converting, the digital cancellation signal of the second self-interference signal into an analog cancellation signal of the second self-interference signal. Correspondingly, that the third interference cancellation submodule is configured to cancel the second self-interference signal from the second receive signal based on the cancellation signal of the second self-interference signal, to obtain the second signal includes: canceling the second self-interference signal from the second receive signal based on the analog cancellation signal of the second self-interference signal, to obtain an analog signal corresponding to the second signal. The ADC is configured to convert the analog signal corresponding to the second signal into the second signal. Based on the solutions provided in this embodiment of this application, the first device can obtain the second signal.

In a possible design, the first device is an indoor unit IDU, and the second device is an outdoor unit ODU; or the first device is an ODU, and the second device is an IDU.

For technical effects brought about by any one of the second aspect and the possible designs in the second aspect, refer to the first aspect, and details are not described herein again.

According to a third aspect, a first device is provided. The first device includes a processor, and the processor is configured to perform the interference cancellation method according to any one of claim 1 to claim 13.

For technical effects brought about by any one of the third aspect and the possible designs in the third aspect, refer to the first aspect, and details are not described herein again.

According to a fourth aspect, a microwave transmission system is provided. The microwave transmission system includes a first device, a second device, and an intermediate frequency cable that connects the first device and the second device. The first device is an indoor unit IDU, and the second device is an outdoor unit ODU; or the first device is an ODU, and the second device is an IDU. The first device is configured to send a first signal to the second device, where the first signal includes a first transmit signal and a first pilot signal, the first transmit signal generates a first self-interference signal to a receive end of the first device, and the first transmit signal and the first pilot signal use different frequency bands. The second device is configured to send a second receive signal to the first device by using the intermediate frequency cable. The first device is further configured to obtain a second signal, where the second signal includes the first self-interference signal, a second pilot signal, and the second receive signal from the second device, the second pilot signal is a pilot signal obtained after the first pilot signal undergoes a channel jitter, frequency bands used by the first transmit signal and the second receive signal completely or partially overlap, and the second receive signal and the second pilot signal use different frequency bands. The first device is further configured to extract jitter information of the first self-interference signal based on the first pilot signal and the second pilot signal. The first device is further configured to reconstruct a self-interference signal based on the first transmit signal and the jitter information of the first self-interference signal, to obtain a cancellation signal of the first self-interference signal. The first device is further configured to cancel the first self-interference signal from the second receive signal based on the cancellation signal of the first self-interference signal.

For technical effects brought about by the fourth aspect, refer to the first aspect, and details are not described herein again.

DESCRIPTION OF EMBODIMENTS

The following describes the technical solutions in the embodiments of this application with reference to the accompanying drawings in the embodiments of this application. In description of this application, "/" means "or" between associated objects unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one item of the following" or a similar expression thereof represents any combination of these items, including a single item or any combination of a plurality of items. For example, "at least one of a, b, or c" may represent a, b, c, a-b, a-c, b-c, or a-b-c, where a, b, and c may be singular or plural. In addition, to clearly describe the technical solutions in the embodiments of this application, words such as "first" and "second" are used in the embodiments of this application to distinguish between same or similar items that have basically same functions and roles. A person skilled in the art may understand that the words such as "first" and "second" do not limit a quantity or an execution order, and the words such as "first" and "second" do not limit a definite difference either.

Figure 3:
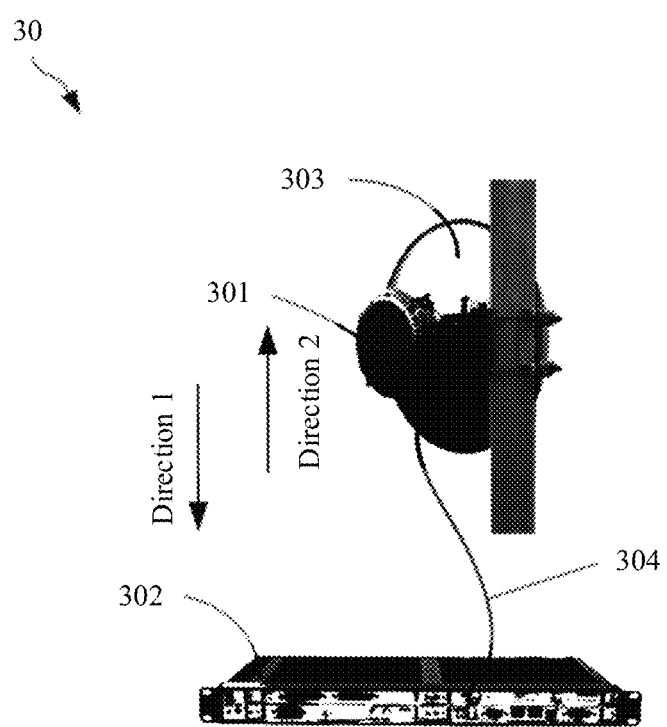
FIG. 3 is a schematic diagram of a specific application scenario according to an embodiment of this application.

FIG. 3 is a schematic diagram of a specific application scenario of solutions in the present invention. The solutions in the present invention are used in a split microwave transmission system 30. The split microwave transmission system 30 mainly includes an ODU 301, an IDU 302, a microwave antenna 303, and an intermediate frequency cable 304.

Main functions of the ODU 301 are performing frequency conversion and amplification for a signal. Specific functions are as follows: In a transmit direction, the ODU 301 performs up-conversion and amplification on a transported analog intermediate frequency signal, converts the transported analog intermediate frequency signal into a radio frequency signal operating at a specific frequency, and sends the radio frequency signal to the microwave antenna 303. In a receive direction, the ODU 301 performs down-conversion and amplification on a radio frequency signal received from the microwave antenna 303, converts the radio frequency signal into an analog intermediate frequency signal, and sends the analog intermediate frequency signal to the IDU 302.

Main functions of the IDU 302 are demodulating the received analog intermediate frequency signal, digitizing the demodulated signal, and obtaining a digital signal through decomposition. At a transmit end, the IDU 302 modulates a baseband digital signal into an analog intermediate frequency signal that can be transmitted.

A main function of the intermediate frequency cable 304 is connecting the IDU 302 and the ODU 301.

The microwave antenna 303 mainly provides a function of transmitting and receiving a radio frequency signal in a directional manner, and implements conversion between a radio frequency signal generated or received by the ODU 301 and a radio frequency signal in atmospheric space. In the transmit direction, the microwave antenna 303 converts a radio frequency signal output by the ODU 301 into a directional radio frequency signal, and radiates the directional radio frequency signal to space. In the receive direction, the microwave antenna 303 receives a radio frequency signal from space, focuses the radio frequency signal, and transports the radio frequency signal to the ODU 301. The microwave antenna 303 and the ODU 301 are connected through a feeding waveguide.

The receive direction in this embodiment of this application is a receive direction of the microwave transmission system 30, and is a direction in which a signal is sent from the microwave antenna 303 to the IDU 302, for example, a direction 1 in FIG. 3. The transmit direction in this embodiment of this application is a transmit direction of the microwave transmission system 30, and is a direction in which a signal is sent from the IDU 302 to the microwave antenna 303, for example, a direction 2 in FIG. 3. This is described herein in a unified manner, and details are not described below again.

The analog intermediate frequency signal in this embodiment of this application is an analog signal obtained after a baseband digital signal undergoes up-conversion and digital-to-analog conversion. Alternatively, the analog intermediate frequency signal in this embodiment of this application is an analog signal obtained after a radio frequency signal undergoes down-conversion and digital-to-analog conversion.

For ease of description, in this embodiment of this application, the IDU 302 may be referred to as a first device, and the ODU 301 may be referred to as a second device; or the IDU 302 may be referred to as a second device, and the ODU 301 may be referred to as a first device. In addition to having the foregoing functions, the first device may perform an interference cancellation method shown in FIG. 4, including the following steps S401 to S405.

S401: A first device sends a first signal to a second device.

The first signal includes a first transmit signal and a first pilot signal, the first transmit signal generates a first self-interference signal to a receive end of the first device, and the first transmit signal and the first pilot signal use different frequency bands.

S402: The first device obtains a second signal.

The second signal includes the first self-interference signal, a second pilot signal, and a second receive signal from the second device. The second pilot signal is a pilot signal obtained after the first pilot signal undergoes a channel jitter, frequency bands used by the first transmit signal and the second receive signal completely or partially overlap, and the second receive signal and the second pilot signal use different frequency bands.

S403: The first device extracts jitter information of the first self-interference signal based on the first pilot signal and the second pilot signal.

In this embodiment of this application, the jitter information of the first self-interference signal is a change in a signal amplitude or signal phase obtained at an $(n+1)^{th}$ sampling point relative to a signal amplitude or signal phase obtained at the $n^{th}$ sampling point. For example, the jitter information may include at least one of phase jitter information or amplitude jitter information.

S404: The first device reconstructs a self-interference signal based on the first transmit signal and the jitter information of the first self-interference signal, to obtain a cancellation signal of the first self-interference signal.

S405: The first device cancels the first self-interference signal from the second receive signal based on the cancellation signal of the first self-interference signal.

In other words, in this embodiment of this application, a transmission bandwidth of an intermediate frequency cable can be accelerated in a manner that uplink and downlink frequency bands completely or partially overlap, and the first self-interference signal generated therefrom can be cancelled. Cancellation herein may be partial or complete cancellation. This is described herein in a unified manner, and this is not specifically limited in this embodiment of this application.

Figure 5A:
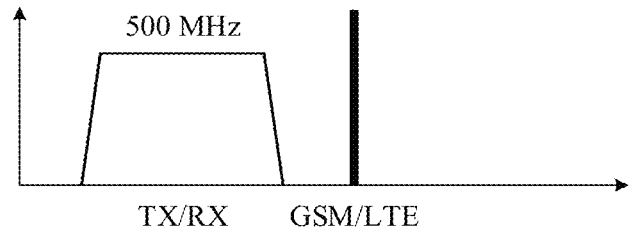
FIG. 5a is a schematic diagram 1 of frequency spectra according to an embodiment of this application.
Figure 5B:
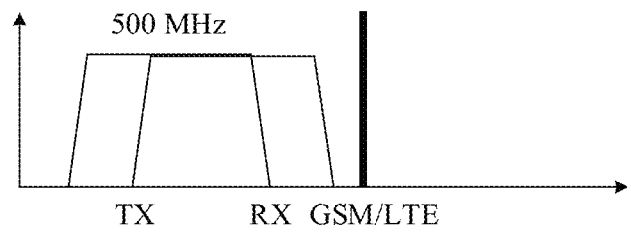
FIG. 5b is a schematic diagram 2 of frequency spectra according to an embodiment of this application.
Figure 5C:
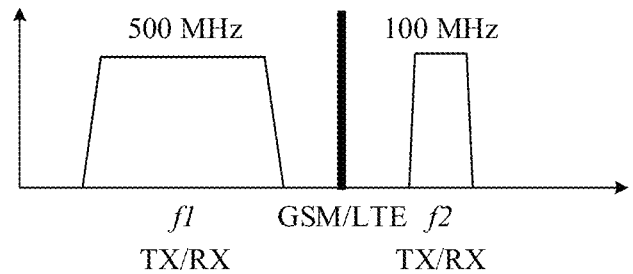
FIG. 5c is a schematic diagram 3 of frequency spectra according to an embodiment of this application.

For example, for a schematic diagram of frequency spectra used by receive and transmit signals (that is, a receive signal and a transmit signal, which are referred to as receive and transmit signals for short hereinafter) in the present invention, refer to FIG. 5a, FIG. 5b, or FIG. 5c. In FIG. 5a or FIG. 5b, both receive and transmit signals may use a lower frequency, and a difference lies in that frequency spectra used by the receive and transmit signals in FIG. 5a completely overlap, and frequency spectra used by the receive and transmit signals in FIG. 5b partially overlap. In FIG. 5c, the present invention is combined with a carrier aggregation (carrier aggregation, CA) technology, to implement intermediate frequency transmission of a larger bandwidth (for example, a post-aggregation transmission bandwidth of an intermediate frequency cable is greater than 600 MHz). For example, CA includes two carrier signals, a center frequency f1 of one carrier signal is 310 MHz, and a center frequency f2 of the other carrier signal is 1.25 GHz. That is, the receive and transmit signals may use not only a lower frequency but also a higher frequency, and frequency spectra used by the receive and transmit signals completely overlap. Certainly, in FIG. 5c, the frequency spectra used by the receive and transmit signals may also partially overlap. Details are not described herein.

Figure 1:
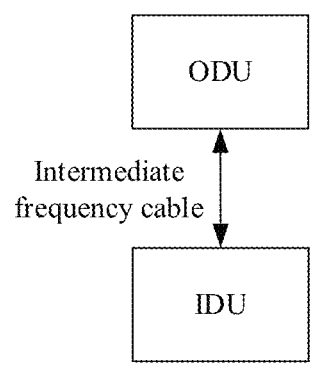
FIG. 1 is a schematic diagram of a split microwave architecture according to the conventional technology.
Figure 2:
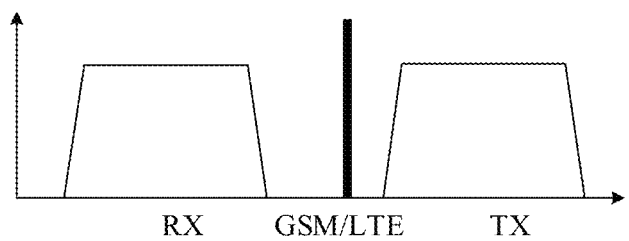
FIG. 2 is a schematic diagram of frequency spectra when a transmission bandwidth of an intermediate frequency cable is accelerated in an FDD manner according to the conventional technology.

Because uplink and downlink frequency bands corresponding to the receive and transmit signals may completely or partially overlap, spectral efficiency can be improved, and a transmission bandwidth of an intermediate frequency cable can be increased. In addition, it can be learned from FIG. 5a, FIG. 5b, or FIG. 5c that compared with FIG. 2, because both the receive and transmit signals in the solutions in the present invention may use a lower frequency, a cable transmission loss is comparatively small, thereby reducing an insertion loss and improving cable shielding performance and port standing-wave performance.

For example, it is assumed that a receive frequency is 310 MHz and a transmit frequency is 1.25 GHz in an existing FDD solution, and both transmit and receive frequencies used in the present invention are 310 MHz. In this case, corresponding to different intermediate frequency cables, attenuations generated during transmission performed by the intermediate frequency cables are separately shown in Table 1.

TABLE 1

| | 5D cable/ 120 m | RG8 cable/ 180 m | 1/2 super-flexible cable/300 m |
|---|---|---|---|
| Conventional FDD (TX intermediate frequency of 1.25 GHz) | 34.4 | 33.9 | 39.6 |
| Present invention (TX/RX intermediate frequency of 310 MHz) | 17.7 | 15.8 | 18.7 |

It can be learned from Table 1 that compared with the existing FDD solution, the solutions in the present invention realize smaller attenuations generated during transmission performed by the intermediate frequency cables. For example, for the 5D cable, an attenuation generated during transmission performed by the intermediate frequency cable is 34.4 dB per 120 meters when the existing FDD solution is used, and is 17.7 dB per 120 meters when the solutions in the present invention are used. Therefore, compared with the existing FDD solution, the solutions in the present invention realize an attenuation reduction of 16.7 dB (that is, 34.4−17.7=16.7 dB) per 120 meters. Alternatively, for the RG8 cable, an attenuation generated during transmission performed by the intermediate frequency cable is 33.9 dB per 180 meters when the existing FDD solution is used, and is 15.8 dB per 180 meters when the solutions in the present invention are used. Therefore, compared with the existing FDD solution, the solutions in the present invention realize an attenuation reduction of 18.1 dB (that is, 33.9−15.8=18.1 dB) per 180 meters. Alternatively, for the ½ super-flexible cable, an attenuation generated during transmission performed by the intermediate frequency cable is 39.6 dB per 300 meters when the existing FDD solution is used, and is 18.7 dB per 300 meters when the solutions in the present invention are used. Therefore, compared with the existing FDD solution, the solutions in the present invention realize an attenuation reduction of 20.9 dB (that is, 39.6−18.7=20.9 dB) per 300 meters.

Figure 4:
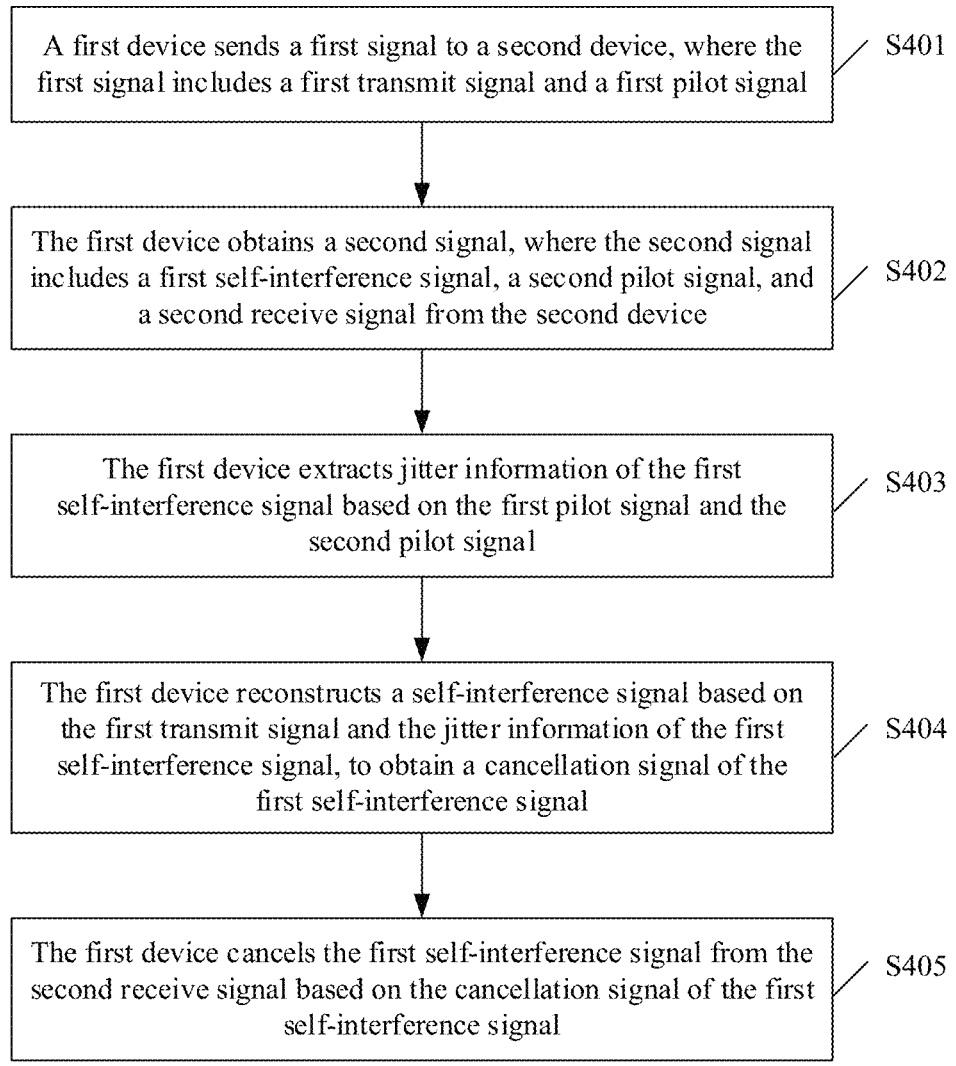
FIG. 4 is a schematic flowchart of an interference cancellation method according to an embodiment of this application.

The following describes in detail the interference cancellation method provided in the embodiment shown in FIG. 4.

Figure 6A:
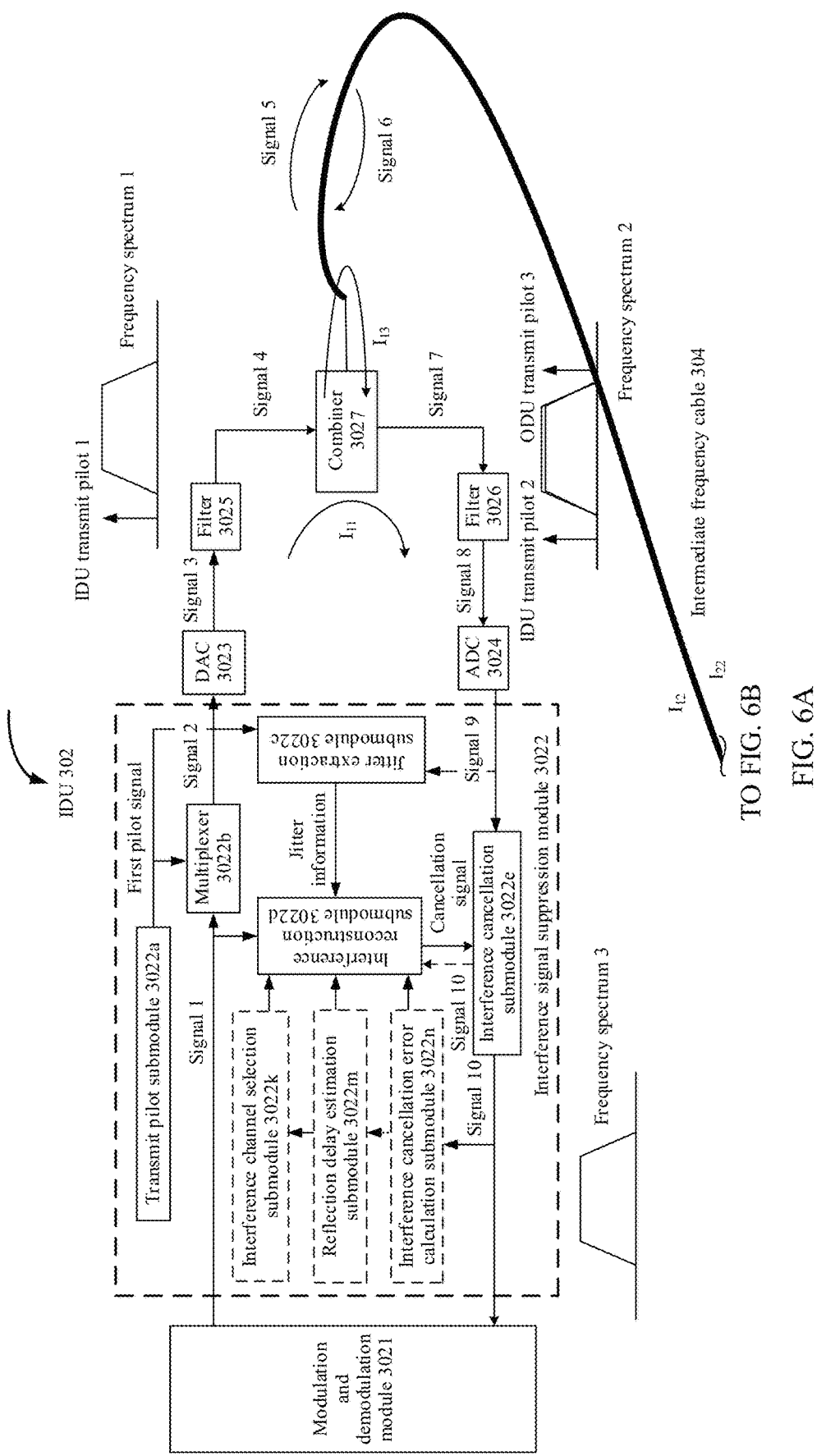
FIG. 6A and FIG. 6B are a schematic structural diagram of an IDU 302 and an ODU 301 according to an embodiment of this application.
Figure 6B:
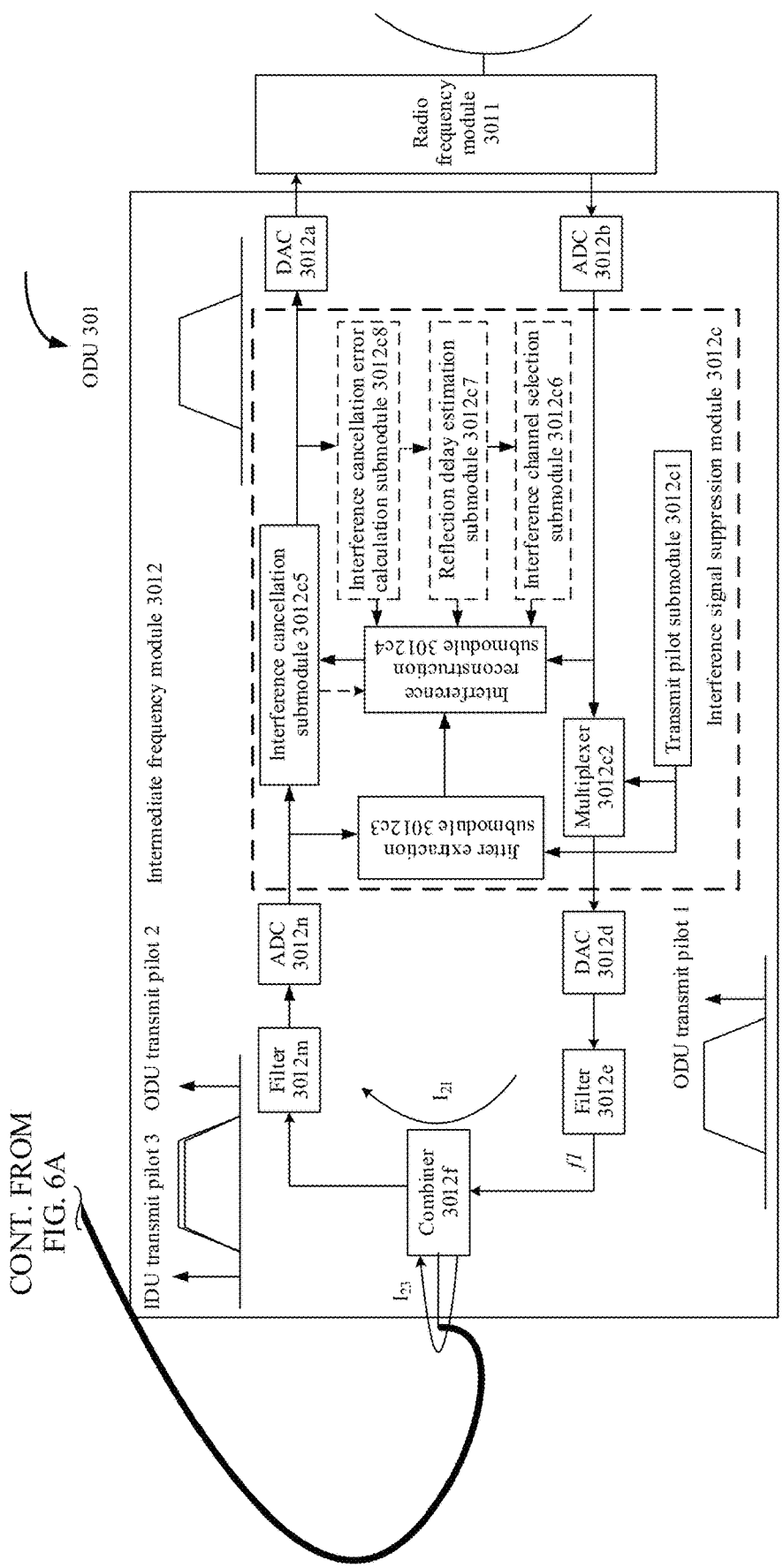

FIG. 6A and FIG. 6B are a schematic structural diagram of an IDU 302 and an ODU 301 according to an embodiment of this application.

The IDU 302 includes boards such as an intermediate frequency board, a system control, switching, and timing board, and a service board.

FIG. 6A and FIG. 6B are merely examples of a schematic structural diagram of the intermediate frequency board. The intermediate frequency board includes a modulation and demodulation module 3021, an interference signal suppression module 3022, a digital-to-analog converter (DAC) 3023, an analog-to-digital converter (ADC) 3024, a filter 3025, a filter 3026, and a combiner 3027.

As shown in FIG. 6A and FIG. 6B, the interference signal suppression module 3022 may include a transmit pilot submodule 3022a, a multiplexer 3022b, a jitter extraction submodule 3022c, an interference reconstruction submodule 3022d, and an interference cancellation submodule 3022e. Optionally, the interference signal suppression module 3022 may further include one or more of an interference channel selection submodule 3022k, a reflection delay estimation submodule 3022m, or an interference cancellation error calculation submodule 3022n. For example, the interference signal suppression module 3022 may further include the interference cancellation error calculation submodule 3022*n*; the interference signal suppression module 3022 may further include the reflection delay estimation submodule 3022*m*; the interference signal suppression module 3022 may further include the interference channel selection submodule 3022*k* and the reflection delay estimation submodule 3022*m*; or the interference signal suppression module 3022 may further include the interference cancellation error calculation submodule 3022*n*, the interference channel selection submodule 3022*k*, and the reflection delay estimation submodule 3022*m*. Whether the interference signal suppression module 3022 includes the interference cancellation error calculation submodule 3022*n* depends on an algorithm used for reconstruction of a self-interference signal. For example, if an adaptive algorithm is used for reconstruction of a self-interference signal, the interference signal suppression module 3022 may not include the interference cancellation error calculation submodule 3022*n*. In addition, the interference cancellation error calculation submodule 3022*n* in this embodiment of this application may also be referred to as a received signal strength indicator (RSSI) calculation submodule. This is described herein in a unified manner, and details are not described below again.

The ODU 301 includes an intermediate frequency module 3012 and a radio frequency module 3011.

The intermediate frequency module 3012 includes a DAC 3012*a*, an ADC 3012*b*, an interference signal suppression module 3012*c*, a DAC 3012*d*, a filter 3012*e*, a combiner 3012*f*, a filter 3012*m*, and an ADC 3012*n*. As shown in FIG. 6A and FIG. 6B, the interference signal suppression module 3012*c* includes a transmit pilot submodule 3012*c*1, a multiplexer 3012*c*2, a jitter extraction submodule 3012*c*3, an interference reconstruction submodule 3012*c*4, and an interference cancellation submodule 3012*c*5. Optionally, the interference signal suppression module 3012*c* may further include one or more of an interference channel selection submodule 3012*c*6, a reflection delay estimation submodule 3012*c*7, or an interference cancellation error calculation submodule 3012*c*8. For example, the interference signal suppression module 3012*c* may further include the interference cancellation error calculation submodule 3012*c*8; the interference signal suppression module 3012*c* may further include the reflection delay estimation submodule 3012*c*7; the interference signal suppression module 3012*c* may further include the interference channel selection submodule 3012*c*6 and the reflection delay estimation submodule 3012*c*7; or the interference signal suppression module 3012*c* may further include the interference cancellation error calculation submodule 3012*c*8, the interference channel selection submodule 3012*c*6, and the reflection delay estimation submodule 3012*c*7. Whether the interference signal suppression module 3012*c* includes the interference cancellation error calculation submodule 3012*c*8 depends on an algorithm used for reconstruction of a self-interference signal. For example, if an adaptive algorithm is used for reconstruction of a self-interference signal, the interference signal suppression module 3012*c* may not include the interference cancellation error calculation submodule 3012*c*8.

As shown in FIG. 6A and FIG. 6B, on an IDU 302 side: An output end of the modulation and demodulation module 3021 is separately connected to an input end of the multiplexer 3022*b* and an input end of the interference reconstruction submodule 3022*d*; an output end of the transmit pilot submodule 3022*a* is separately connected to the input end of the multiplexer 3022*b* and an input end of the jitter extraction submodule 3022*c*; an output end of the multiplexer 3022*b* is connected to an input end of the DAC 3023; an output end of the DAC 3023 is connected to an input end of the filter 3025; an output end of the filter 3025 is connected to an input end of the combiner 3027; an output end of the combiner 3027 is connected to an input end of the filter 3026; an output end of the filter 3026 is connected to an input end of the ADC 3024; an output end of the ADC 3024 is separately connected to an input end of the interference cancellation submodule 3022*e* and the input end of the jitter extraction submodule 3022*c*; an output end of the jitter extraction submodule 3022*c* is connected to the input end of the interference reconstruction submodule 3022*d*; an output end of the interference reconstruction submodule 3022*d* is connected to the input end of the interference cancellation submodule 3022*e*; and an output end of the interference cancellation submodule 3022*e* is connected to an input end of the modulation and demodulation module 3021.

Optionally, as shown in FIG. 6A and FIG. 6B, if the interference signal suppression module 3022 includes the interference channel selection submodule 3022*k*, the reflection delay estimation submodule 3022*m*, and the interference cancellation error calculation submodule 3022*n*, the output end of the interference cancellation submodule 3022*e* may also be connected to an input end of the interference cancellation error calculation submodule 3022*n*. An output end of the interference cancellation error calculation submodule 3022*n* may be connected to the input end of the interference reconstruction submodule 3022*d*. Optionally, the output end of the interference cancellation error calculation submodule 3022*n* may be connected to an input end of the reflection delay estimation submodule 3022*m*. An output end of the reflection delay estimation submodule 3022*m* may be separately connected to an input end of the interference channel selection submodule 3022*k* and the input end of the interference reconstruction submodule 3022*d*. An output end of the interference channel selection submodule 3022*k* may be connected to the input end of the interference reconstruction submodule 3022*d*. Certainly, if the interference signal suppression module 3022 does not include the interference cancellation error calculation submodule 3022*n*, the output end of the interference cancellation submodule 3022*e* may also be directly connected to the input end of the interference reconstruction submodule 3022*d* and the input end of the reflection delay estimation submodule 3022*m*. This is not specifically limited in this embodiment of this application.

On an ODU 301 side: An output end of the radio frequency module 3011 is connected to an input end of the ADC 3012*b*; an output end of the ADC 3012*b* is separately connected to an input end of the multiplexer 3012*c*2 and an input end of the interference reconstruction submodule 3012*c*4; an output end of the transmit pilot submodule 3012*c*1 is separately connected to the input end of the multiplexer 3012*c*2 and an input end of the jitter extraction submodule 3012*c*3; an output end of the multiplexer 3012*c*2 is connected to an input end of the DAC 3012*d*; an output end of the DAC 3012*d* is connected to an input end of the filter 3012*e*; an output end of the filter 3012*e* is connected to an input end of the combiner 3012*f*; an output end of the combiner 3012*f* is connected to an input end of the filter 3012*m*; an output end of the filter 3012*m* is connected to an input end of the ADC 3012*n*; an output end of the ADC 3012*n* is separately connected to an input end of the interference cancellation submodule 3012*c*5 and the input end of the jitter extraction submodule 3012*c*3; an output end of the jitter extraction submodule 3012*c*3 is connected to the input end of the interference reconstruction submodule 3012*c*4; an output end of the interference reconstruction submodule 3012c4 is connected to the input end of the interference cancellation submodule 3012c5; an output end of the interference cancellation submodule 3012c5 is connected to an input end of the DAC 3012a; and an output end of the DAC 3012a is connected to an input end of the radio frequency module 3011.

Optionally, as shown in FIG. 6A and FIG. 6B, if the interference signal suppression module 3012c includes the interference channel selection submodule 3012c6, the reflection delay estimation submodule 3012c7, and the interference cancellation error calculation submodule 3012c8, the output end of the interference cancellation submodule 3012c5 may also be connected to an input end of the interference cancellation error calculation submodule 3012c8. An output end of the interference cancellation error calculation submodule 3012c8 may be connected to the input end of the interference reconstruction submodule 3012c4. Optionally, the output end of the interference cancellation error calculation submodule 3012c8 may be connected to an input end of the reflection delay estimation submodule 3012c7. An output end of the reflection delay estimation submodule 3012c7 may be separately connected to an input end of the interference channel selection submodule 3012c6 and the input end of the interference reconstruction submodule 3012c4. An output end of the interference channel selection submodule 3012c6 may be connected to the input end of the interference reconstruction submodule 3012c4. Certainly, if the interference signal suppression module 3012c does not include the interference cancellation error calculation submodule 3012c8, the output end of the interference cancellation submodule 3012c5 may also be directly connected to the input end of the interference reconstruction submodule 3012c4 and the input end of the reflection delay estimation submodule 3012c7, as shown by a dashed arrow in FIG. 6A and FIG. 6B. This is not specifically limited in this embodiment of this application.

It can be learned from FIG. 6A and FIG. 6B that in this embodiment of this application, the combiner 3027 is used to connect a transmit end and a receive end that are of the IDU 302, and the combiner 3012f is used to connect a transmit end and a receive end that are of the ODU 301. The combiner 3027 and the combiner 3012f are connected through an intermediate frequency cable 304, and a combined signal is sent to the intermediate frequency cable 304.

It should be noted that as shown in FIG. 6A and FIG. 6B, in this embodiment of this application, the transmit end of the IDU 302 is a part between the output end of the modulation and demodulation module 3021 and the input end of the combiner 3027; the receive end of the IDU 302 is a part between the output end of the combiner 3027 and the input end of the modulation and demodulation module 3021; the transmit end of the ODU 301 is a part between the output end of the radio frequency module 3011 and the input end of the combiner 3012f; and the receive end of the ODU 301 is a part between the output end of the combiner 3012f and the input end of the radio frequency module 3011. The output end of the radio frequency module 3011 herein is an output end of the radio frequency module 3011 in a receive direction, and the input end of the radio frequency module 3011 herein is an input end of the radio frequency module 3011 in a transmit direction. This is described herein in a unified manner, and details are not described below again.

Optionally, a combiner (including the combiner 3027 and the combiner 30120 in this embodiment of this application may also be referred to as a power divider, and may implement an isolation between transmission and reception (for example, 20 dB). This is not specifically limited in this embodiment of this application.

For example, the first device is the IDU 302, and the second device is the ODU 301. Specifically, frequency bands used by receive and transmit signals of the first device and the second device are made to completely or partially overlap.

On the IDU 302 side, the modulation and demodulation module 3021 generates a baseband digital signal, denoted as a signal 1, and the transmit pilot submodule 3022a generates a first pilot signal. The first pilot signal is added when the signal 1 is transmitted. The multiplexer 3022b is configured to multiplex the signal 1 and the first pilot signal into a signal, denoted as a signal 2.

The signal 2 is converted into an analog signal by the DAC 3023, and the analog signal is denoted as a signal 3.

The signal 3 is filtered by the filter 3025, and a signal 4 is obtained. The signal 4 includes an IDU transmit pilot 1 and an IDU transmit signal, as shown by a frequency spectrum 1 in FIG. 6A and FIG. 6B. The IDU transmit pilot 1 herein is a pilot signal obtained after the first pilot signal passes through a channel between the transmit pilot submodule 3022a and the filter 3025. When the channel between the transmit pilot submodule 3022a and the filter 3025 has a smaller impact, the IDU transmit pilot 1 may be considered as the first pilot signal.

Optionally, the first pilot signal in this embodiment of this application may be a monophonic pilot carrier or a modulated narrowband pilot carrier, and is used to estimate jitter information of a first self-interference signal generated when the IDU 302 sends a first transmit signal to the ODU 301, to improve a self-interference cancellation capability. Specific implementation is described with reference to FIG. 11 and FIG. 12 in the following embodiments, and details are not described herein.

The first transmit signal herein may be any one of the signal 1, the signal 2, the signal 3, or the signal 4. This is described herein in a unified manner, and details are not described below again.

After the signal 4 passes through the combiner 3027, one part (denoted as a signal 5) of the signal 4 is sent to the intermediate frequency cable 304 and enters the receive end of the ODU 301, and another part (including a second pilot signal and the first self-interference signal generated from the first transmit signal to the receive end of the IDU 302, where the second pilot signal is a pilot signal obtained after the first pilot signal undergoes a jitter caused by a channel between the transmit end of the IDU 302 and the receive end of the IDU 302) of the signal 4 enters the receive end of the IDU 302. In addition, the receive end of the IDU 302 may further obtain a signal, denoted as a signal 6, that the transmit end of the ODU 301 sends to the receive end of the IDU 302 by using the intermediate frequency cable 304. That is, as shown in FIG. 6A and FIG. 6B, the receive end of the IDU 302 may obtain a signal 7. The signal 7 includes the first self-interference signal generated from the first transmit signal to the receive end of the IDU 302, the second pilot signal, and the signal 6. The signal 6 includes a second receive signal from the ODU 301 and a third pilot signal from the ODU 301. Because frequency bands used by the first self-interference signal and the second receive signal partially or completely overlap, the first self-interference signal and the second receive signal cannot be separately detected. In other words, the receive end of the IDU 302 may detect a second signal, where the second signal includes the second pilot signal, the third pilot signal, the first self-interference signal, and the second receive signal. The second pilot signal, the third pilot signal, the first self-interference signal, and the second receive signal herein are all analog signals. Assuming that the second pilot signal is denoted as an IDU transmit pilot 2, and the third pilot signal is denoted as an ODU transmit pilot 3, a schematic diagram of a frequency spectrum corresponding to the signal 7 is shown by a frequency spectrum 2 in FIG. 6A and FIG. 6B (in FIG. 6A and FIG. 6B, an example in which frequency bands used by receive and transmit signals completely overlap is used for illustration).

Frequency bands used by the first transmit signal and the second receive signal in this embodiment of this application completely or partially overlap.

In this embodiment of this application, a frequency band used by the second pilot signal is different from the frequency band used by the second receive signal, and a frequency band used by the first pilot signal is different from the frequency band used by the first transmit signal. This can avoid that the first pilot signal is interfered by the first transmit signal, and the second pilot signal is interfered by the second receive signal, and can further avoid a resulting low pilot signal-to-noise ratio.

As shown in FIG. 6A and FIG. 6B, the first self-interference signal in this embodiment of this application may include a near-end transmit-receive isolated interference signal $I_{11}$, a near-end reflected interference signal $I_{13}$, and a far-end reflected interference signal $I_{12}$. The far-end reflected interference signal $I_{12}$ may include far-end reflected interference signals resulting from one or more reflections, for example, includes an interference signal $I_{121}$ resulting from the first far-end reflection, an interference signal $I_{122}$ resulting from the second far-end reflection, . . . , and an interference signal $I_{12P}$ resulting from a $P^{th}$ far-end reflection, where P is a quantity of far-end reflections, and P is a positive integer.

After the signal 7 passes through the filter 3026, a signal 8 is obtained. The signal 8 is converted into a digital signal by the ADC 3024, and the digital signal is denoted as a signal 9. An example is used for description in which an impact caused by a channel between the combiner 3027 and the jitter extraction submodule 3022c is ignored. In this case, the signal 9 includes the second pilot signal, the third pilot signal, the first self-interference signal, and the second receive signal. The second pilot signal, the third pilot signal, the first self-interference signal, and the second receive signal herein are all digital signals.

The jitter extraction submodule 3022c may extract the jitter information of the first self-interference signal based on the first pilot signal and the signal 9. Specifically, considering that the first pilot signal and the first transmit signal pass through the same channel between the transmit end of the IDU 302 and the receive end of the IDU 302, and the second pilot signal is obtained after the first pilot signal undergoes a channel jitter, the jitter extraction submodule 3022c detects the second pilot signal from the signal 9, may obtain channel jitter information based on a difference between the second pilot signal and the first pilot signal, and then may determine the jitter information of the first self-interference signal based on the channel jitter information.

After extracting the jitter information of the first self-interference signal, the jitter extraction submodule 3022c inputs the jitter information of the first self-interference signal into the interference reconstruction submodule 3022d. Further, the interference reconstruction submodule 3022d may reconstruct a self-interference signal based on the input signal 1 and the jitter information of the first self-interference signal, and after obtaining a cancellation signal of the first self-interference signal, input the cancellation signal of the first self-interference signal into the interference cancellation submodule 3022e.

The interference cancellation submodule 3022e may cancel the first self-interference signal from the second receive signal based on the input cancellation signal of the first self-interference signal and the signal 9, and after obtaining a signal 10, input the signal 10 into the modulation and demodulation module 3021, and optionally, input the signal 10 into the interference reconstruction submodule 3022d. Before or after canceling the first self-interference signal from the second receive signal, the interference cancellation submodule 3022e may filter out the third pilot signal and the second pilot signal in the signal 9. Therefore, a schematic diagram of a frequency spectrum corresponding to the output signal 10 is shown by a frequency spectrum 3 in FIG. 6A and FIG. 6B. The frequency spectrum 3 does not include a pilot signal.

It should be noted that the frequency spectrum 3 is described by using an example in which the first self-interference signal is completely cancelled, and only the second receive signal from the ODU 301 is included. Certainly, in an actual scenario, the first self-interference signal may not necessarily be completely cancelled, and it may be that a part of interference is reduced only to some extent. In this case, the schematic diagram of the frequency spectrum corresponding to the signal 10 may further include a self-interference signal that is not cancelled. This is not specifically limited in this embodiment of this application.

In addition, optionally, as shown in FIG. 6A and FIG. 6B, if the interference signal suppression module 3022 includes the interference channel selection submodule 3022k, the reflection delay estimation submodule 3022m, and the interference cancellation error calculation submodule 3022n, the signal 10 may be input into the interference cancellation error calculation submodule 3022n, and an obtained interference cancellation error reference value is sent to both the reflection delay estimation submodule 3022m and the interference reconstruction submodule 3022d. A delay parameter output by the reflection delay estimation submodule 3022m is sent to both the interference channel selection submodule 3022k and the interference reconstruction submodule 3022d. Certainly, if the interference signal suppression module 3022 does not include the interference cancellation error calculation submodule 3022n, the signal 10 may be directly input into the interference reconstruction submodule 3022d and the reflection delay estimation submodule 3022m. This is not specifically limited in this embodiment of this application.

The foregoing example uses a working principle of the IDU 302 as an example for description. The corresponding interference cancellation method may be implemented by the interference signal suppression module 3022 in the IDU 302.

A working principle of the ODU 301 is similar to the working principle of the IDU 302, and a difference lies in that: For example, in the receive direction on the ODU 301 side, one input signal of the multiplexer 3012c2 is a first pilot signal, and the other input signal of the multiplexer 3012c2 is a digital signal obtained after the ADC 3012b performs analog-to-digital conversion on a radio frequency signal received by the radio frequency module 3011 from a microwave antenna 303; and in the transmit direction on the ODU 301 side, one output signal of the interference cancellation submodule 3012c5 passes through the DAC 3012a for digital-to-analog conversion, an analog signal is obtained, and then the analog signal is sent to the microwave antenna 303 through the radio frequency module 3011. In addition, a frequency of the first pilot signal output by the transmit pilot submodule 3012c1 in the ODU 301 is different from a frequency of the first pilot signal output by the transmit pilot submodule 3022a in the IDU 302. This can avoid mutual interference caused between the first pilot signal output by the transmit pilot submodule 3012c1 in the ODU 301 and the first pilot signal output by the transmit pilot submodule 3022a in the IDU 302, and can further avoid a resulting low pilot signal-to-noise ratio. For other related descriptions, refer to the working principle of the IDU 302, and details are not described herein again.

It should be noted that because the interference cancellation method provided in this embodiment of this application is mainly implemented by the interference signal suppression module 3022 in the IDU 302 or the interference signal suppression module 3012c in the ODU 301, and a working principle of the interference signal suppression module 3022 in the IDU 302 is the same as a working principle of the interference signal suppression module 3012c in the ODU 301, to avoid repeated descriptions, all the following examples use interference cancellation in the IDU 302 as an example for description. This is described herein in a unified manner, and details are not described below again.

In conclusion, based on the interference cancellation method provided in this embodiment of this application, a generated self-interference signal can be reduced while spectral efficiency is improved and a transmission bandwidth of an intermediate frequency cable is increased. In addition, in the transmit direction, the radio frequency module 3011 in the ODU 301 includes a power amplifier (PA). Based on the interference cancellation method provided in this embodiment of this application, a transmit signal that passes through the PA does not include a pilot signal, thereby meeting a requirement of a transmit spectrum profile.

Optionally, in a possible implementation, that the first device reconstructs a self-interference signal based on the first transmit signal and the jitter information of the first self-interference signal (step S404) may include: The first device reconstructs a near-end interference signal based on the first transmit signal and the jitter information of the first self-interference signal, where the near-end interference signal includes a near-end reflected interference signal and a near-end transmit-receive isolated interference signal.

Alternatively, optionally, in another possible implementation, that the first device reconstructs a self-interference signal based on the first transmit signal and the jitter information of the first self-interference signal (step S404) may include: The first device determines that X far-end reflected interference signal cancellations need to be performed, where X is a positive integer; and the first device reconstructs, based on the first transmit signal and the jitter information of the first self-interference signal, a near-end interference signal, and an interference signal resulting from the first far-end reflection to an interference signal resulting from an $X^{th}$ far-end reflection, where the near-end interference signal includes a near-end reflected interference signal and a near-end transmit-receive isolated interference signal.

Optionally, in this embodiment of this application, that the first device reconstructs, based on the first transmit signal and the jitter information of the first self-interference signal, an interference signal resulting from the first far-end reflection to an interference signal resulting from an $X^{th}$ far-end reflection includes: The first device reconstructs, based on the first transmit signal and the jitter information of the first self-interference signal and with reference to X delay parameters, the interference signal resulting from the first far-end reflection to the interference signal resulting from the $X^{th}$ far-end reflection, where an $f^{th}$ delay parameter in the X delay parameters is used for reconstruction of an interference signal resulting from an $f^{th}$ far-end reflection in the interference signal resulting from the first far-end reflection to the interference signal resulting from the $X^{th}$ far-end reflection, and f is a positive integer greater than or equal to 1.

Figure 7A:
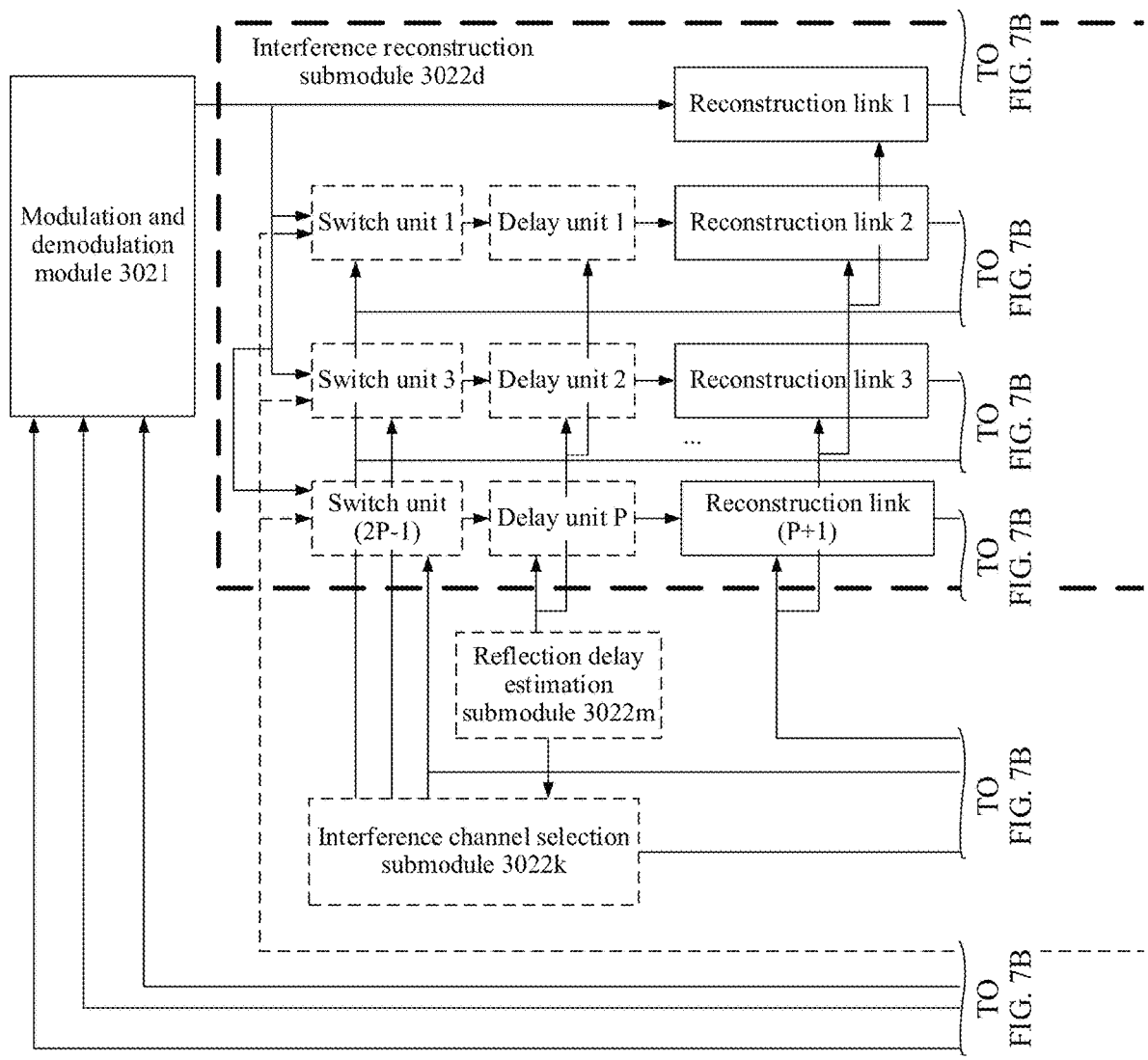
FIG. 7A and FIG. 7B are a schematic structural diagram of an interference reconstruction submodule 3022d according to an embodiment of this application.
Figure 7B:
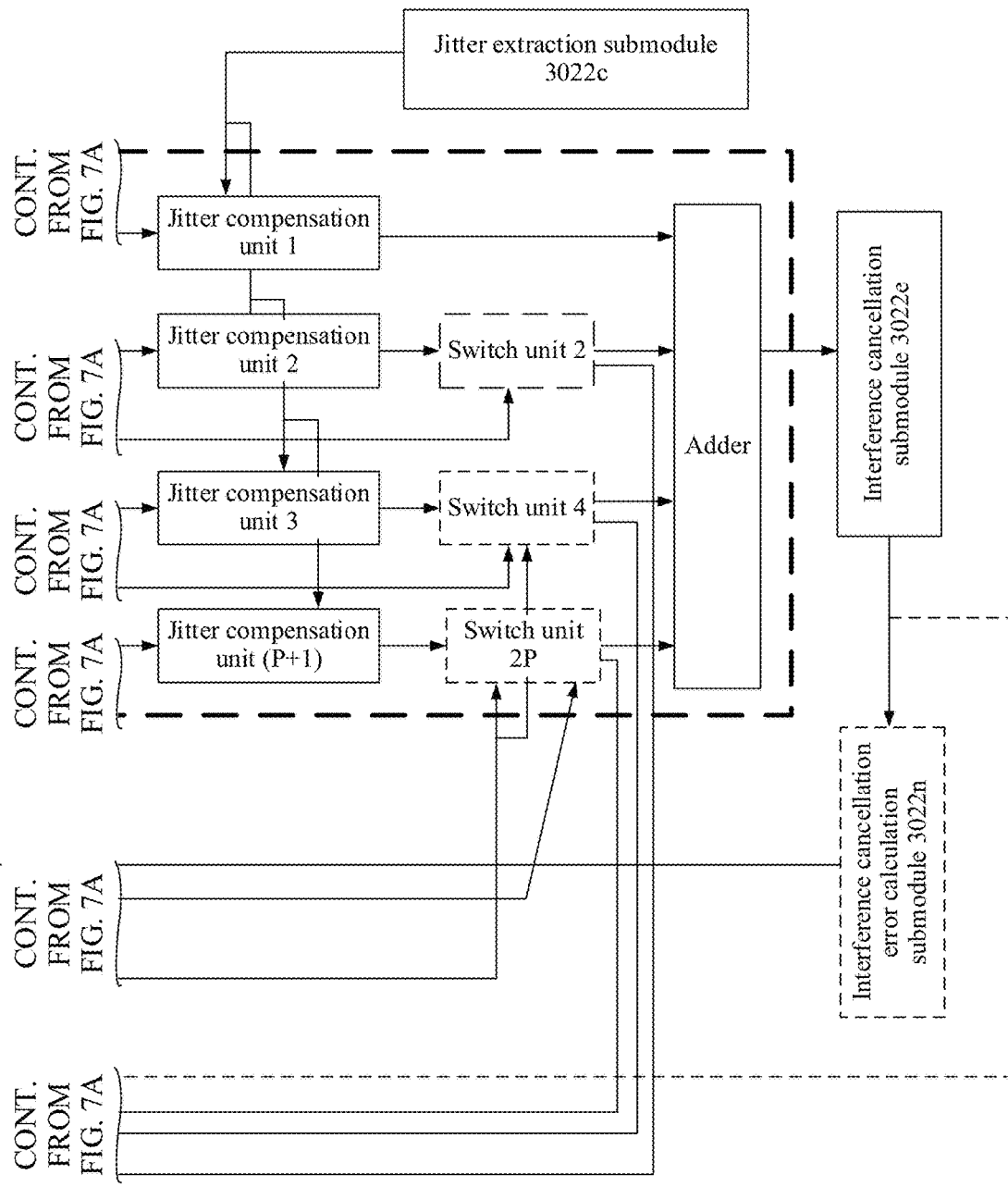

To implement reconstruction of the self-interference signal, for example, refer to FIG. 7A and FIG. 7B that are a schematic structural diagram of an interference reconstruction submodule 3022d according to an embodiment of this application. The interference reconstruction submodule 3022d is configured to reconstruct the first self-interference signal, and includes one near-end interference signal reconstruction link, denoted as a reconstruction link 1. The reconstruction link 1 is configured to reconstruct the near-end interference signal, to cancel the near-end interference signal, for example, the near-end transmit-receive isolated interference signal $I_{11}$ and the near-end reflected interference signal $I_{13}$. Optionally, the interference reconstruction submodule 3022d may further include one or more far-end reflected interference signal reconstruction links, for example, a reconstruction link 2, a reconstruction link 3, ..., and a reconstruction link (P+1) in FIG. 7A and FIG. 7B, where P is a quantity of far-end reflections. A $y^{th}$ far-end reflected interference signal reconstruction link in the P far-end reflected interference signal reconstruction links is configured to reconstruct an interference signal resulting from the $y^{th}$ far-end reflection, to cancel the interference signal resulting from the $y^{th}$ far-end reflection, where y is a positive integer less than or equal to P. For example, the interference signal $I_{121}$ resulting from the first far-end reflection may be reconstructed by using the reconstruction link 2, to cancel the interference signal $I_{121}$ resulting from the first far-end reflection; and the interference signal $I_{122}$ resulting from the second far-end reflection may be reconstructed by using the reconstruction link 3, to cancel the interference signal $I_{122}$ resulting from the second far-end reflection. By analogy, the interference signal $I_{12P}$ resulting from a $P^{th}$ far-end reflection may be reconstructed by using the reconstruction link (P+1), to cancel the interference signal $I_{12P}$ resulting from the $P^{th}$ far-end reflection.

Optionally, each reconstruction link in this embodiment of this application may be implemented by an equalizer. The equalizer simulates a channel impulse response, and then performs convolution on the first transmit signal (herein, an example in which the first transmit signal is the signal 1 is used for description) and a channel, thus obtaining an interference signal similar to the first self-interference signal.

In addition, as shown in FIG. 7A and FIG. 7B, the interference reconstruction submodule 3022d further includes a jitter compensation unit corresponding to each reconstruction link. For example, the interference reconstruction submodule 3022d further includes a jitter compensation unit 1 corresponding to the reconstruction link 1, a jitter compensation unit 2 corresponding to the reconstruction link 2, a jitter compensation unit 3 corresponding to the reconstruction link 3, ..., and a jitter compensation unit (P+1) corresponding to the reconstruction link (P+1).

Each reconstruction link reconstructs a corresponding self-interference signal by using the adaptive algorithm, and a jitter of the corresponding self-interference signal is suppressed by a corresponding jitter compensation unit. For example, the reconstruction link 1 reconstructs the near-end interference signal by using the adaptive algorithm, and a jitter of the near-end interference signal is suppressed by the jitter compensation unit 1. Alternatively, for example, the reconstruction link 2 reconstructs, by using the adaptive algorithm, the interference signal $I_{121}$ resulting from the first far-end reflection, and a jitter of the interference signal $I_{121}$ resulting from the first far-end reflection is suppressed by the jitter compensation unit 2, and so on. Details are not described herein.

Optionally, the adaptive algorithm in this embodiment of this application may be, for example, an algorithm such as a least mean square (LMS) algorithm or a recursive least square (RLS) algorithm. Adaptive updating of a tap coefficient of a reconstruction link is implemented by using a minimum interference cancellation error reference value criterion. This is not specifically limited in this embodiment of this application.

In addition, as shown in FIG. 7A and FIG. 7B, the interference reconstruction submodule 3022$d$ may further include an adder. The adder is configured to process the self-interference signals reconstructed by the reconstruction links, and after obtaining the cancellation signal of the first self-interference signal, send the cancellation signal of the first self-interference signal to the interference cancellation submodule 3022$e$.

Optionally, if the interference signal suppression module 3022 in FIG. 6A and FIG. 6B includes the reflection delay estimation submodule 3022$m$, as shown in FIG. 7A and FIG. 7B, the interference reconstruction submodule 3022$d$ further includes a delay unit corresponding to each far-end reflected interference signal reconstruction link, for example, includes a delay unit 1 corresponding to the reconstruction link 2, a delay unit 2 corresponding to the reconstruction link 3, . . . , and a delay unit P corresponding to the reconstruction link (P+1). These delay units are mainly used for time synchronization of each reconstruction link.

Optionally, if the interference signal suppression module 3022 in FIG. 6A and FIG. 6B includes the interference channel selection submodule 3022$k$, as shown in FIG. 7A and FIG. 7B, the interference reconstruction submodule 3022$d$ further includes switch units corresponding to each far-end reflected interference signal reconstruction link, for example, includes a switch unit 1 and a switch unit 2 that correspond to the reconstruction link 2, a switch unit 3 and a switch unit 4 that correspond to the reconstruction link 3, . . . , and a switch unit (2P−1) and a switch unit 2P that correspond to the reconstruction link (P+1). These switch units perform automatic control by using the interference channel selection submodule 3022$k$, and can implement shutdown or activation of the corresponding reconstruction links, thereby reducing power consumption. Optionally, also by using the switch unit, a reconstruction link may be used to cancel standing-wave interference in a received wanted signal in the modulation and demodulation module 3021.

For connections of the units in the interference reconstruction submodule 3022$d$ and connections between the units in the interference reconstruction submodule 3022$d$ and each of the modulation and demodulation module 3021, the interference channel selection submodule 3022$k$, the reflection delay estimation submodule 3022$m$, the interference cancellation error calculation submodule 3022$n$, the interference cancellation submodule 3022$e$, and the jitter extraction submodule 3022$c$ that are in the IDU 302, refer to an embodiment shown in FIG. 7A and FIG. 7B, and details are not described herein.

It should be noted that when the interference reconstruction submodule 3022$d$ shown in FIG. 7A and FIG. 7B includes the switch units, output ends of the switch unit 2, the switch unit 4, . . . , and the switch unit 2P are connected to the input end of the modulation and demodulation module 3021 for cancellation of standing-wave interference in a main signal. This is described herein in a unified manner, and details are not described below again.

It should be noted that in FIG. 7A and FIG. 7B, merely an example in which an output end of each reconstruction link is connected to an input end of a corresponding jitter compensation unit is used for illustration. Certainly, the units or modules in FIG. 7A and FIG. 7B may be alternatively connected in another manner. For example, it may alternatively be that an input end of each reconstruction link is connected to an output end of a corresponding jitter compensation unit. This is not specifically limited in this embodiment of this application.

Based on the interference reconstruction submodule 3022$d$ shown in FIG. 7A and FIG. 7B, reconstruction of the foregoing self-interference signal can be implemented.

Optionally, in this embodiment of this application, that the first device determines that X far-end reflected interference signal cancellations need to be performed includes: The first device obtains a $k^{th}$ delay parameter and a $(k+1)^{th}$ delay parameter, where the $k^{th}$ delay parameter is a delay parameter of an interference signal resulting from a $k^{th}$ far-end reflection, the $(k+1)^{th}$ delay parameter is a delay parameter of an interference signal resulting from a $(k+1)^{th}$ far-end reflection, and k is a positive integer greater than or equal to 1; the first device determines, based on the $k^{th}$ delay parameter and the $(k+1)^{th}$ delay parameter, a length of an intermediate frequency cable that connects the first device and the second device; and the first device determines, based on the length of the intermediate frequency cable, that the X far-end reflected interference signal cancellations need to be performed.

Optionally, that the first device determines, based on the length of the intermediate frequency cable, that X far-end reflected interference signal cancellations need to be performed includes: The first device determines, based on the length of the intermediate frequency cable, one or more thresholds corresponding to a case in which a cancellation demand of the first self-interference signal is 0 dB; and if the length of the intermediate frequency cable is not greater than a first threshold, the first device determines that the X far-end reflected interference signal cancellations need to be performed, where X is a quantity of all current far-end reflected interference signal reconstruction links, and the first threshold is a minimum threshold in the one or more thresholds; if the length of the intermediate frequency cable is not less than a second threshold, the first device determines that one far-end reflected interference signal cancellation needs to be performed, where the second threshold is a maximum threshold in the one or more thresholds; or if the length of the intermediate frequency cable is greater than a third threshold and less than a fourth threshold, the first device determines that the X far-end reflected interference signal cancellations need to be performed, where the third threshold is an $X^{th}$ threshold obtained after the one or more thresholds are sorted in descending order, the fourth threshold is an $(X−1)^{th}$ threshold obtained after the one or more thresholds are sorted in descending order, and X is a positive integer greater than or equal to 2.

Figure 8:
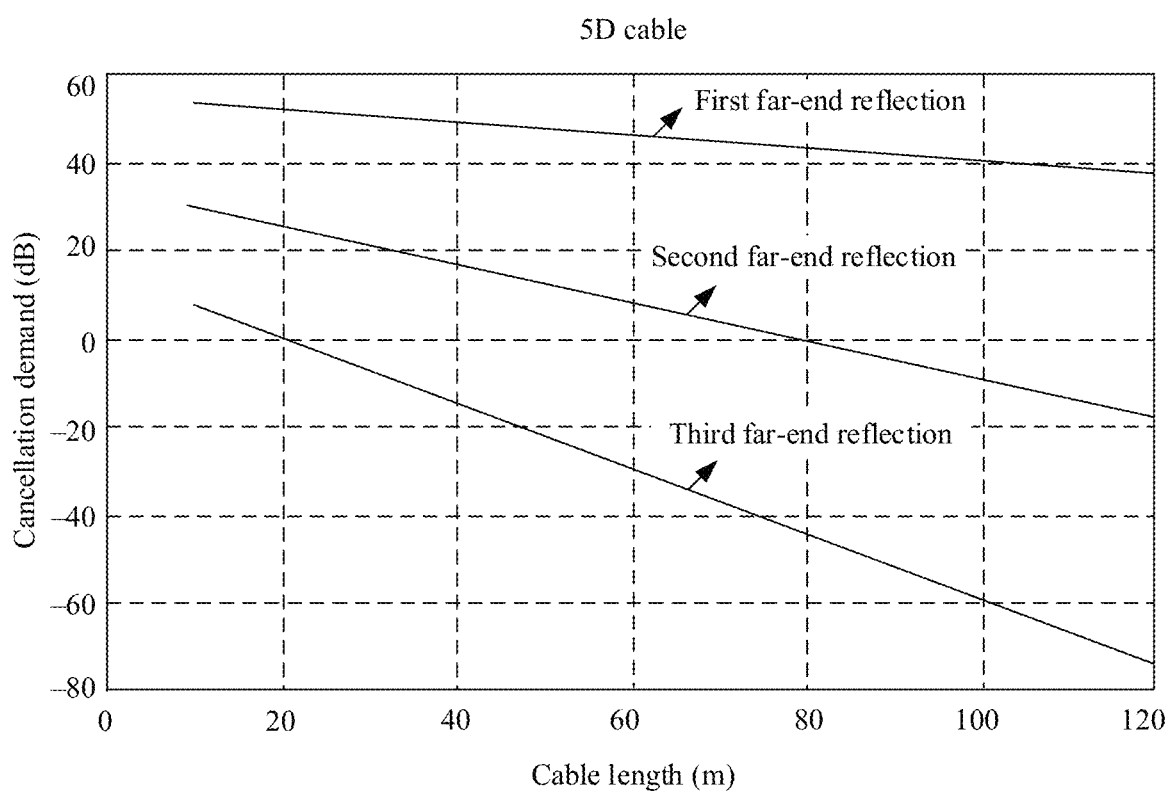
FIG. 8 is a cancellation demand curve of a 5D cable according to an embodiment of this application.
Figure 9:
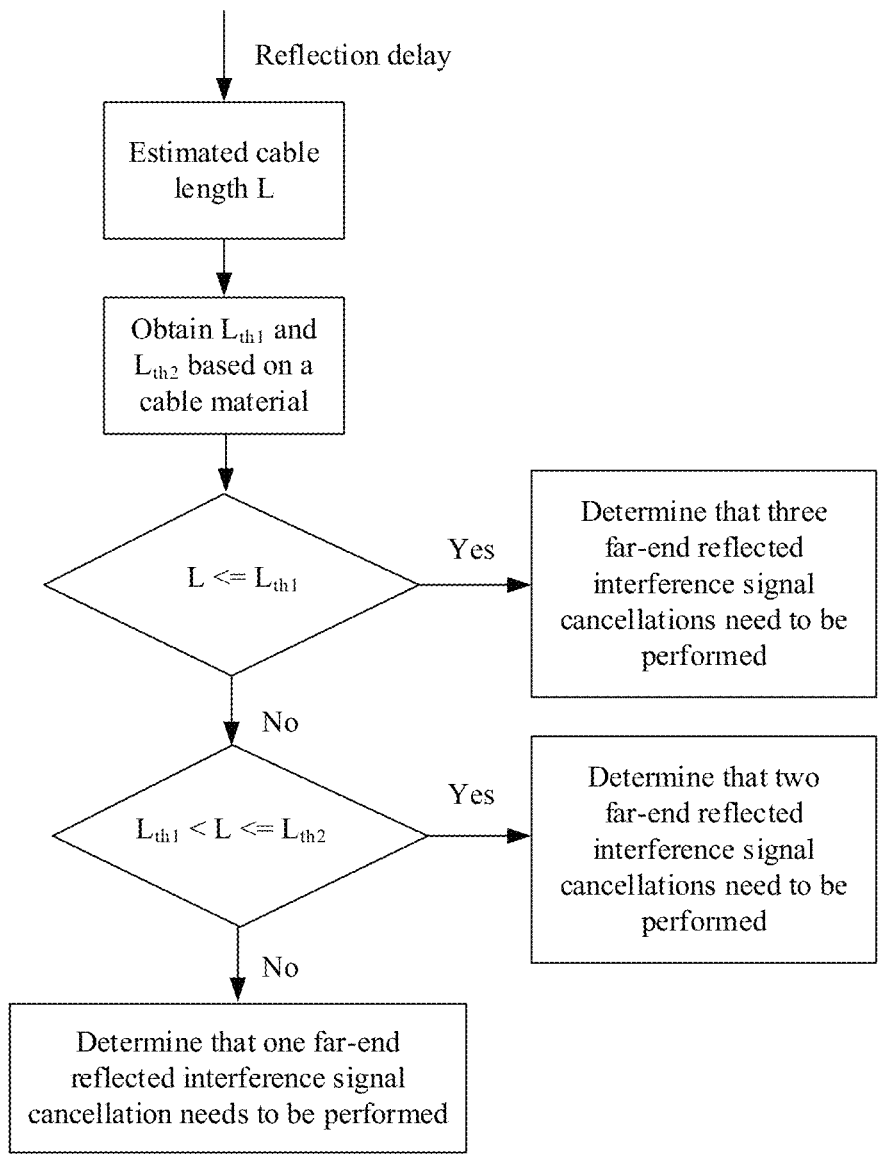
FIG. 9 is a schematic flowchart of determining a quantity of required far-end reflected interference signal reconstruction links according to an embodiment of this application.

For example, with reference to FIG. 7A and FIG. 7B, it is assumed that a quantity P of all current far-end reflected interference signal reconstruction links is equal to 3. The delay unit 1 in the interference reconstruction submodule 3022*d* may obtain a delay parameter 1, denoted as DLY 1, and the delay unit 2 in the interference reconstruction submodule 3022*d* may obtain a delay parameter 2, denoted as DLY 2. In this case, a length of an intermediate frequency cable L=[(DLY 2−DLY 1)×c]/2, where c is a speed of light ($3 \times 10^8$ m/s). Specifically, different cable materials correspond to different cancellation demand curves. For example, a cancellation demand curve of a 5D cable is shown in FIG. 8. It can be learned that the case in which the cancellation demand of the first self-interference signal is 0 dB corresponds to two thresholds: $L_{th1}$=20 (m) and $L_{th2}$=80 (m). When an estimated cable length is less than or equal to $L_{th1}$, it is determined that three far-end reflected interference signal cancellations need to be performed, that is, all the three far-end reflected interference signal reconstruction links are made to be used for cancellation of the first self-interference signal. If a cable length is less than or equal to $L_{th2}$ and greater than $L_{th1}$, it is determined that two far-end reflected interference signal cancellations need to be performed, that is, a first far-end reflected interference signal reconstruction link (for example, the reconstruction link 2 in FIG. 7A and FIG. 7B) and a second far-end reflected interference signal reconstruction link (for example, the reconstruction link 3 in FIG. 7A and FIG. 7B) are made to be used for cancellation of the first self-interference signal, and one far-end reflected interference signal reconstruction link (for example, a reconstruction link 4 not shown in FIG. 7A and FIG. 7B) is shut down or made to participate in cancellation of a standing wave in the main signal. If a cable length is greater than $L_{th2}$, it is determined that one far-end reflected interference signal cancellation needs to be performed, that is, a first far-end reflected interference signal reconstruction link (for example, the reconstruction link 2 in FIG. 7A and FIG. 7B) is made to be used for cancellation of the first self-interference signal, and two far-end reflected interference signal reconstruction links (for example, the reconstruction link 3 in FIG. 7A and FIG. 7B and a reconstruction link 4 not shown in FIG. 7A and FIG. 7B) are shut down or made to participate in cancellation of a standing wave in the main signal. Details are shown in FIG. 9.

Optionally, in the foregoing example, an example in which k=1 is used for description during calculation of the length of the intermediate frequency cable. Certainly, a value of k may alternatively be 2. That is, the length of the intermediate frequency cable may be alternatively calculated by using the following formula: L=[(DLY 3−DLY 2)×c]/2, where DLY 3 is the third delay parameter, and may be obtained by a delay unit 3 in the interference reconstruction submodule 3022*d* in FIG. 7A and FIG. 7B. This is not specifically limited in this embodiment of this application.

Optionally, in this embodiment of this application, the reflection delay estimation submodule 3022*m* in FIG. 7A and FIG. 7B may provide a delay parameter for a delay unit in FIG. 7A and FIG. 7B. That the first device obtains a $t^{th}$ delay parameter, where t=k or t=k+1 includes: The first device adjusts a delay parameter corresponding to a $t^{th}$ delay module, and determines, as the $t^{th}$ delay parameter, a delay parameter corresponding to a maximum minimum mean square error (mean square error, MSE) of the received second receive signal.

Figure 10:
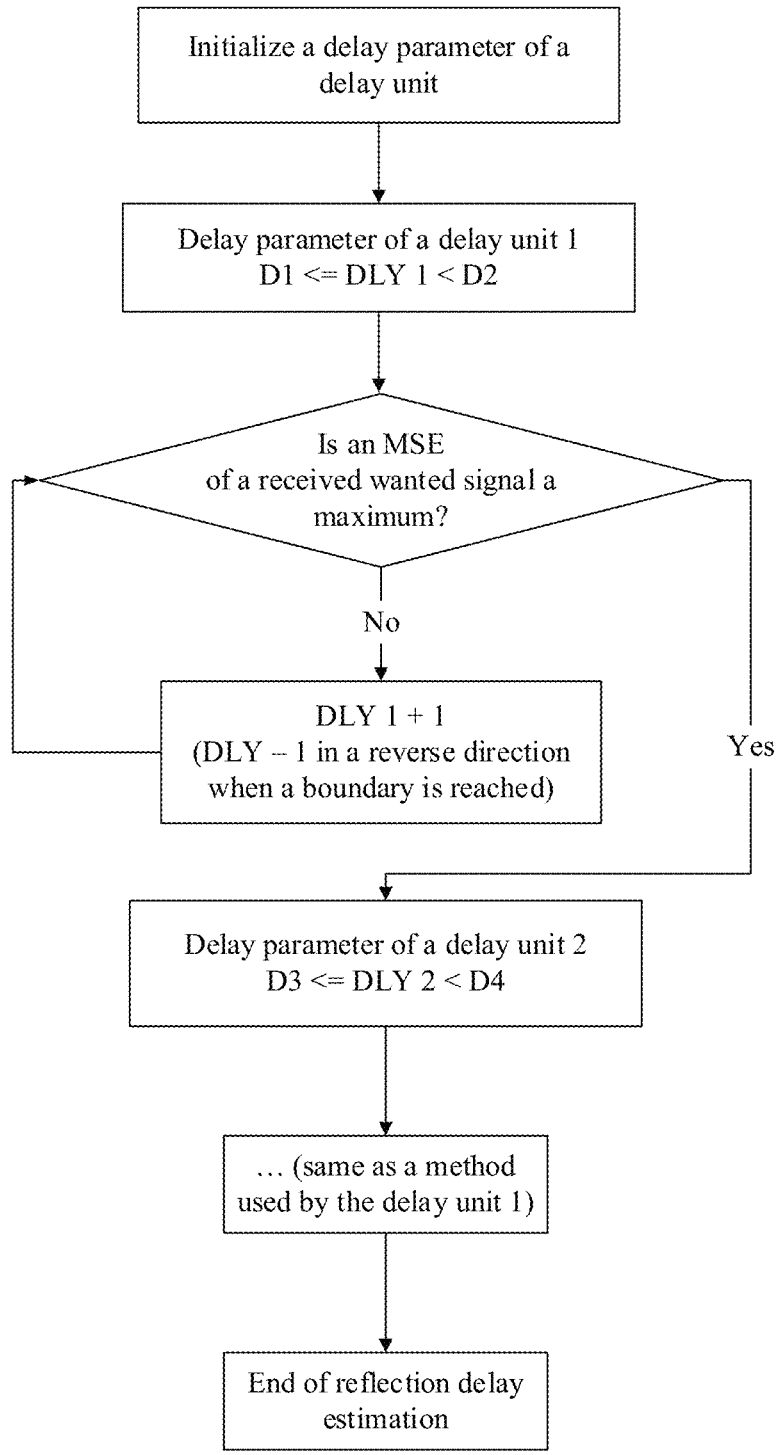
FIG. 10 is a schematic flowchart of a reflection delay estimation method according to an embodiment of this application.

For example, a reflection delay estimation method is shown in FIG. 10. First, initial delay values of DLY 1 to DLY P of delay units are set, where P is a quantity of far-end reflections, or may be considered as a quantity of delay units in FIG. 7A and FIG. 7B. A delay adjustment range of a delay unit 1 is D1 to D2, a delay adjustment range of a delay unit 2 is D3 to D4, and so on. A delay parameter of the delay unit 1 is adjusted as follows: increasing a delay by one beat (that is, one sampling clock) until a boundary is reached, and then decreasing the delay by one beat in a reverse direction; or decreasing a delay by one beat until a boundary is reached, and then increasing the delay by one beat in a reverse direction, so that an MSE of a received wanted signal is a maximum, and in this case, the delay parameter of the delay unit 1 is obtained. Then, delay parameters of the delay unit 2 to a delay unit P are obtained in a same manner.

Optionally, in this embodiment of this application, it may alternatively be that the first device adjusts a delay parameter corresponding to the $t^{th}$ delay module, and determines, as the $t^{th}$ delay parameter, a delay parameter corresponding to a minimum first interference cancellation error reference value, where the first interference cancellation error reference value may be input by the interference cancellation error calculation submodule 3022*n* in FIG. 7A and FIG. 7B. This is not specifically limited in this embodiment of this application.

Optionally, in this embodiment of this application, that the first device extracts jitter information of the first self-interference signal based on the first pilot signal and the second pilot signal (step S403) may include: The first device converts the second pilot signal into a narrowband pilot signal; and the first device extracts the jitter information of the first self-interference signal from the narrowband pilot signal based on the first pilot signal.

Figure 11:
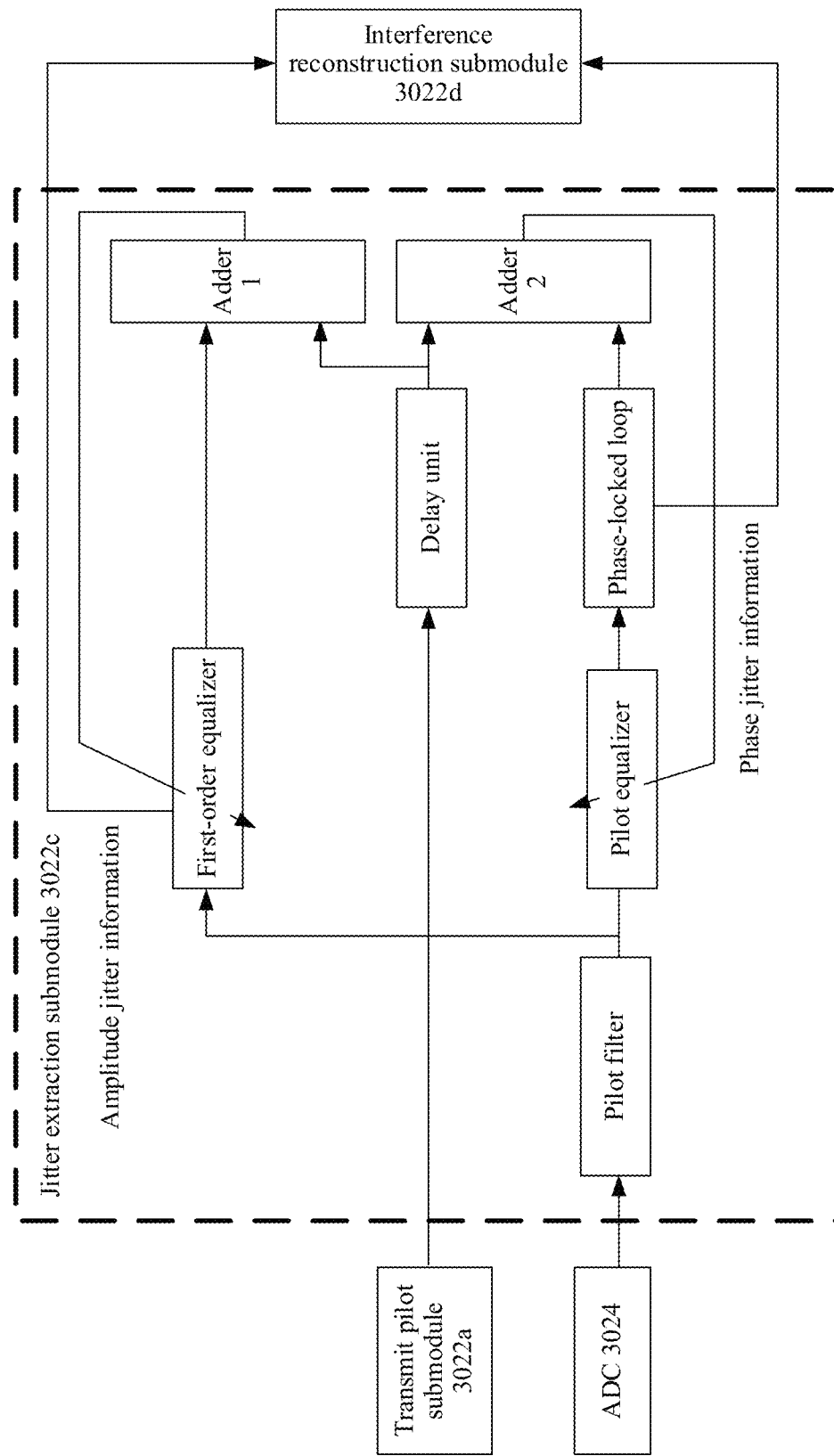
FIG. 11 is a schematic structural diagram 1 of a jitter extraction submodule 3022c according to an embodiment of this application.

For example, an example is used in which the jitter information of the first self-interference signal includes phase jitter information of the first self-interference signal and amplitude jitter information of the first self-interference signal. In this case, a possible implementation corresponding to the jitter extraction submodule 3022*c* in FIG. 6A and FIG. 6B is shown in FIG. 11. The jitter extraction submodule 3022*c* includes a pilot filter, a pilot equalizer, a phase-locked loop, a first-order equalizer, a delay unit, an adder 1, and an adder 2. For connections of the units in the jitter extraction submodule 3022*c* and connections between the units in the jitter extraction submodule 3022*c* and each of the transmit pilot submodule 3022*a*, the ADC 3024, and the interference reconstruction submodule 3022*d* that are in the IDU 302, refer to an embodiment shown in FIG. 11, and details are not described herein.

Specifically, in FIG. 11, after a signal (corresponding to the signal 9 in FIG. 6A and FIG. 6B) output by the ADC 3024 passes through the pilot filter, a narrowband pilot signal is obtained. The first pilot signal output by the transmit pilot submodule 3022*a* is used as a reference. After the first pilot signal passes through the pilot equalizer and the phase-locked loop, phase jitter information may be extracted, and after the first pilot signal passes through the first-order equalizer, amplitude jitter information may be extracted.

Alternatively, optionally, in this embodiment of this application, that the first device extracts jitter information of the first self-interference signal based on the first pilot signal and the second pilot signal (step S403) may include: The first device converts the second pilot signal into a monophonic pilot signal; and the first device extracts the jitter information of the first self-interference signal from the monophonic pilot signal based on the first pilot signal.

Figure 12:
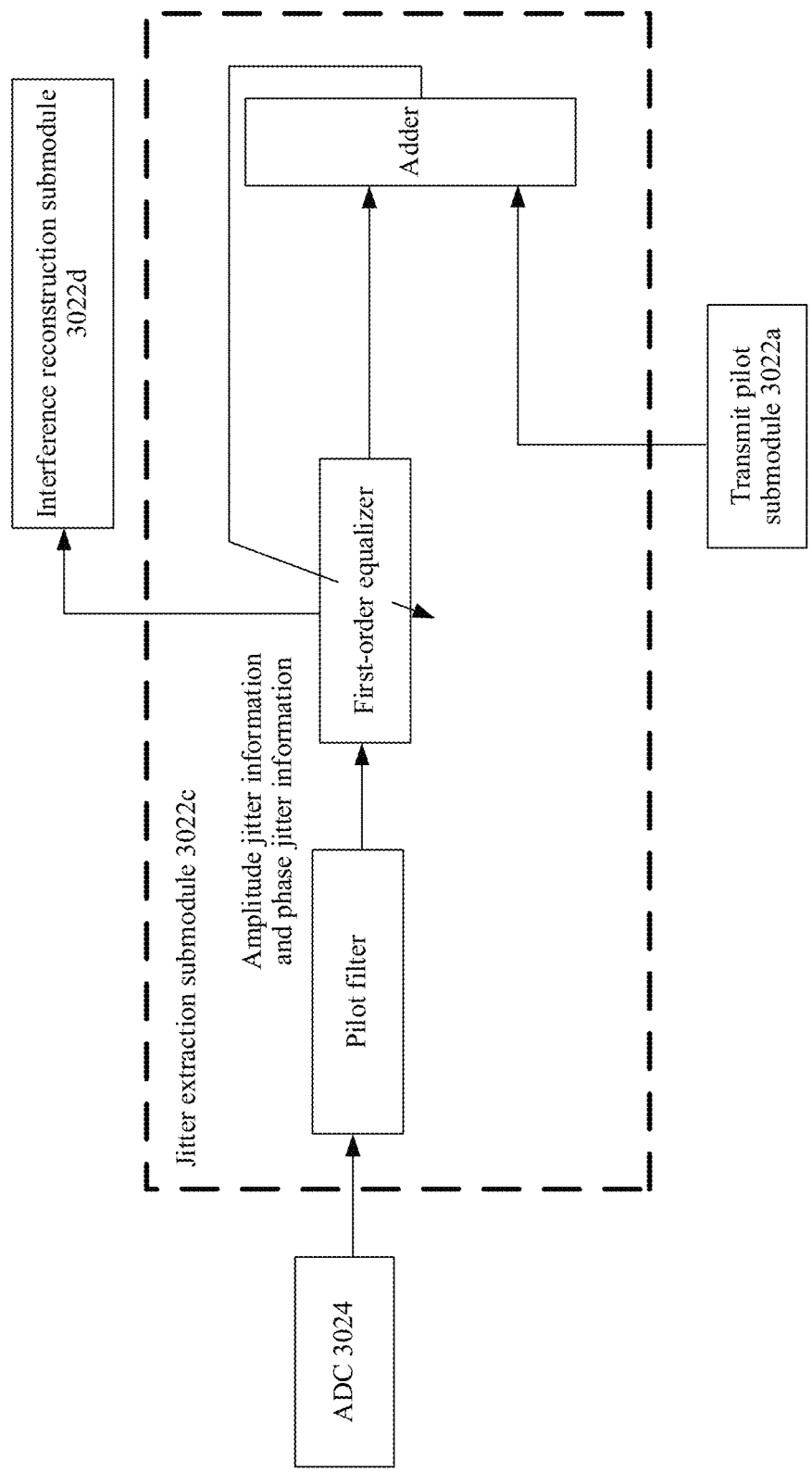
FIG. 12 is a schematic structural diagram 2 of a jitter extraction submodule 3022c according to an embodiment of this application.

For example, an example is used in which the jitter information of the first self-interference signal includes phase jitter information of the first self-interference signal and amplitude jitter information of the first self-interference signal. In this case, another possible implementation corresponding to the jitter extraction submodule 3022c in FIG. 6A and FIG. 6B is shown in FIG. 12. The jitter extraction submodule 3022c includes a pilot filter, a first-order equalizer, and an adder. For connections of the units in the jitter extraction submodule 3022c and connections between the units in the jitter extraction submodule 3022c and each of the transmit pilot submodule 3022a, the ADC 3024, and the interference reconstruction submodule 3022d that are in the IDU 302, refer to an embodiment shown in FIG. 12, and details are not described herein.

Specifically, in FIG. 12, after a signal (corresponding to the signal 9 in FIG. 6A and FIG. 6B) output by the ADC 3024 passes through the pilot filter, a monophonic pilot signal is obtained. The first pilot signal output by the transmit pilot submodule 3022a is used as a reference. After the first pilot signal passes through the first-order equalizer, phase jitter information and amplitude jitter information may be extracted.

Optionally, the pilot equalizer and the first-order equalizer in FIG. 11 and the first-order equalizer in FIG. 12 in this embodiment of this application may be implemented by using an algorithm such as the LMS or RLS algorithm. The extracted phase jitter information and amplitude jitter information may be sent to the interference reconstruction submodule 3022d for compensation of phase and amplitude jitters.

Based on the jitter extraction submodule 3022c shown in FIG. 11 or FIG. 12, the jitter information of the first self-interference signal can be extracted.

For example, when the first self-interference signal is completely cancelled, it is assumed that an intermediate frequency (that is, a frequency selected when a signal is transmitted in an intermediate frequency cable, and greater than half of a microwave bandwidth) is 310 MHz. If a transmit power of the IDU 302 is 0 dBm, a signal-to-noise ratio (SNR) at the transmit end of the IDU 302 is 55 dB, and an isolation of the combiner 3027 is 20 dB, a power of noise leaked to the receive end of the IDU 302 is −75 dB (0−55−20=−75 dB). In addition, when the intermediate frequency is 310 MHz, the attenuation generated during transmission performed by the 5D intermediate frequency cable is 17.7 dB per 120 meters. Assuming that a transmit power of the ODU 301 is 0 dBm, and a sum of insertion losses of the combiner 3027 and the combiner 3012f in FIG. 6A and FIG. 6B is about 7 dB, a total attenuation of a transmit signal of the ODU 301 after being transmitted by the intermediate frequency cable is 24.7 dB (17.7+7=24.7 dB). Therefore, an SNR of a wanted signal received by the IDU 302 is 50.3 dB (SNR=(−24.7)−(−75)=50.3 dB). Because an SNR threshold for bit-error-free 4K quadrature amplitude modulation (QAM) operation is 41.5 dB, based on the solutions in the present invention, transmission in higher-order modulation mode may be further supported.

It should be noted that the foregoing example merely uses an example for description in which the first self-interference signal is completely cancelled. Certainly, in an actual scenario, the first self-interference signal may not necessarily be completely cancelled, and it may be that a part of interference is reduced only to some extent. This is not specifically limited in this embodiment of this application.

Optionally, in the schematic diagram, shown in FIG. 5c, of the frequency spectra used by the receive and transmit signals, when $f_2$ is 1.25 GHz, a transmit power of the IDU 302 is 0 dBm, an SNR at the transmit end of the IDU 302 is 55 dB, and an isolation of the combiner 3027 is 20 dB, a power of noise leaked to the receive end of the IDU 302 is −75 dB (0−55−20=−75 dB). In addition, when the intermediate frequency is 1.25 GHz, the attenuation generated during transmission performed by the 5D intermediate frequency cable is 34.4 dB per 120 meters. Assuming that a transmit power of the ODU 301 is 0 dBm, and a sum of insertion losses of the combiner 3027 and the combiner 3012f in FIG. 6A and FIG. 6B is about 7 dB, a total attenuation of a transmit signal of the ODU 301 after being transmitted by the intermediate frequency cable is 41.4 dB (34.4+7=41.4 dB). Therefore, an SNR of a wanted signal received by the IDU 302 is 33.6 dB (SNR=(−41.4)−(−75)= 33.6 dB). Because an SNR threshold for bit-error-free 4K QAM operation is 41.5 dB, in this case, it is difficult to support transmission in higher-order modulation mode. In other words, because $f_2$ is a comparatively high frequency, an attenuation caused by an intermediate frequency cable is comparatively large. Consequently, a wanted signal on an $f_2$ carrier has a comparatively low SNR, and reception performance of the IDU 302 is affected.

To improve the SNR, self-interference noise generated by the $f_2$ frequency carrier needs to be cancelled. By using the solutions provided in the foregoing embodiment, the first self-interference signal can be cancelled, but self-interference noise generated by the $f_2$ frequency carrier to the receive end of the first device cannot be cancelled. In other words, the second signal obtained by the receive end of the first device further includes the self-interference noise generated by the $f_2$ frequency carrier to the receive end of the first device. Based on this, when the first transmit signal includes a first carrier signal and a second carrier signal, and a center frequency of the second carrier signal is higher than a GSM/LTE interfering frequency, the interference cancellation method provided in this embodiment of this application may further include: The first device reconstructs self-interference noise based on the first transmit signal and a second interference cancellation error reference value, to obtain a cancellation signal of the self-interference noise; and the first device cancels the self-interference noise from the second receive signal based on the cancellation signal of the self-interference noise.

Optionally, in a possible implementation, that the first device reconstructs self-interference noise based on the first transmit signal and a second interference cancellation error reference value, to obtain a cancellation signal of the self-interference noise includes: The first device determines, based on the second interference cancellation error reference value, a reconstruction parameter used for reconstruction of analog self-interference noise; and the first device reconstructs the analog self-interference noise based on the reconstruction parameter and the first transmit signal, to obtain an analog cancellation signal of the self-interference noise. Correspondingly, that the first device cancels the self-interference noise from the second receive signal based on the cancellation signal of the self-interference noise includes: The first device cancels the self-interference noise from the second receive signal based on the analog cancellation signal of the self-interference noise.

Figure 13A:
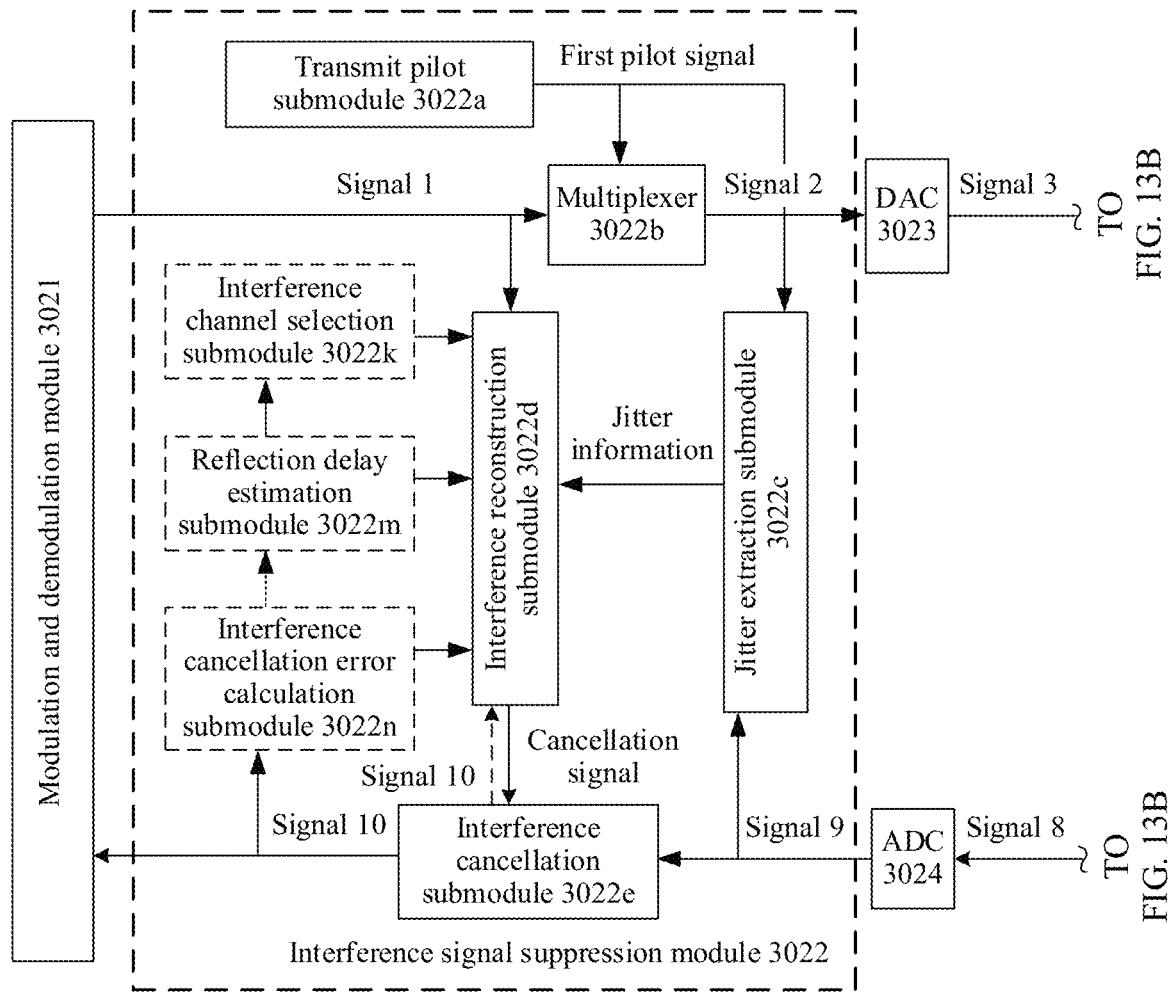
FIG. 13A and FIG. 13B are another schematic structural diagram of an IDU 302 according to an embodiment of this application.
Figure 13B:
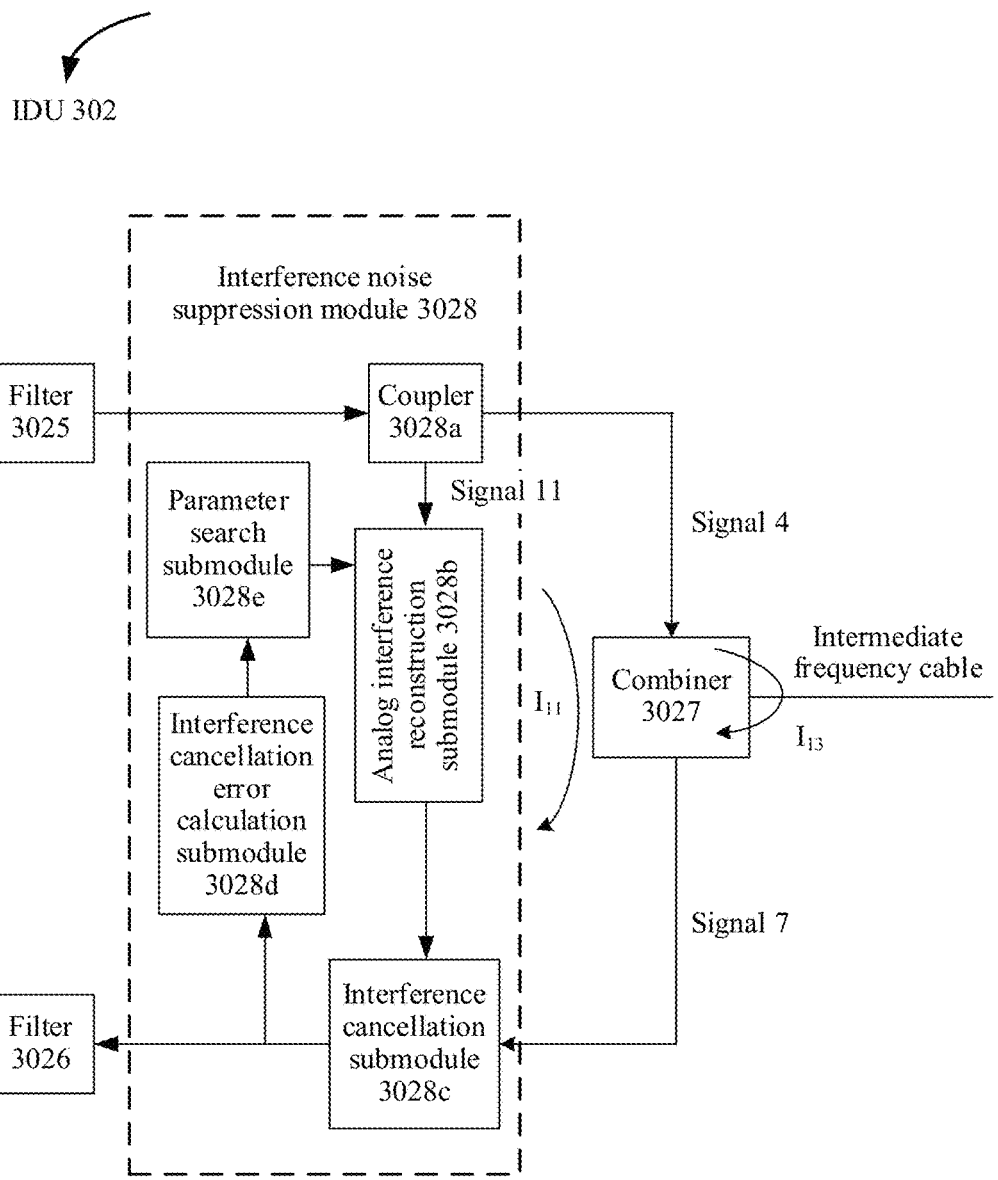

To implement cancellation of the self-interference noise, for example, refer to FIG. 13A and FIG. 13B that are another schematic structural diagram of an IDU 302 according to an embodiment of this application. Compared with the IDU 302 shown in FIG. 6A and FIG. 6B, this IDU 302 is added with an interference noise suppression module 3028. As shown in FIG. 13A and FIG. 13B, the interference noise suppression module 3028 includes a coupler 3028a, an analog interference reconstruction submodule 3028b, an interference cancellation submodule 3028c, an interference cancellation error calculation submodule 3028d, and a parameter search submodule 3028e. An output end of a filter 3025 is connected to an input end of the coupler 3028a; an output end of the coupler 3028a is separately connected to an input end of a combiner 3027 and an input end of the analog interference reconstruction submodule 3028b; an output end of the combiner 3027 is connected to an input end of the interference cancellation submodule 3028c; an output end of the interference cancellation submodule 3028c is separately connected to an input end of the interference cancellation error calculation submodule 3028d and an input end of a filter 3026; an output end of the interference cancellation error calculation submodule 3028d is connected to an input end of the parameter search submodule 3028e; an output end of the parameter search submodule 3028e is connected to the input end of the analog interference reconstruction submodule 3028b; and an output end of the analog interference reconstruction submodule 3028b is connected to the input end of the interference cancellation submodule 3028c.

Optionally, in this embodiment of this application, the parameter search submodule 3028e may be implemented in a plurality of manners, for example, by using a gradient descent method or a Newton method. This is not specifically limited in this embodiment of this application.

Optionally, in this embodiment of this application, a function of the interference cancellation submodule 3028c may be implemented by a coupler, an adder, or a subtractor. This is not specifically limited in this embodiment of this application.

Specifically, assuming that a first transmit signal is a signal 1, in FIG. 13A and FIG. 13B, a signal 11 may be obtained after the signal 1 passes through a multiplexer 3022b, a DAC 3023, the filter 3025, and the coupler 3028a. The coupler 3028a is configured to perform coupling on a signal output by the filter 3025, to obtain the signal 11. Further, the analog interference reconstruction submodule 3028b reconstructs analog self-interference noise based on the signal 11 and a reconstruction parameter determined by the parameter search submodule 3028e, and after obtaining an analog cancellation signal of self-interference noise, sends the analog cancellation signal of the self-interference noise to the interference cancellation submodule 3028c. The interference cancellation submodule 3028c cancels the self-interference noise from a second receive signal based on the analog cancellation signal of the self-interference noise. The parameter search submodule 3028e determines the reconstruction parameter based on a second interference cancellation error reference value provided by the interference cancellation error calculation submodule 3028d and a parameter found by search.

Figure 14:
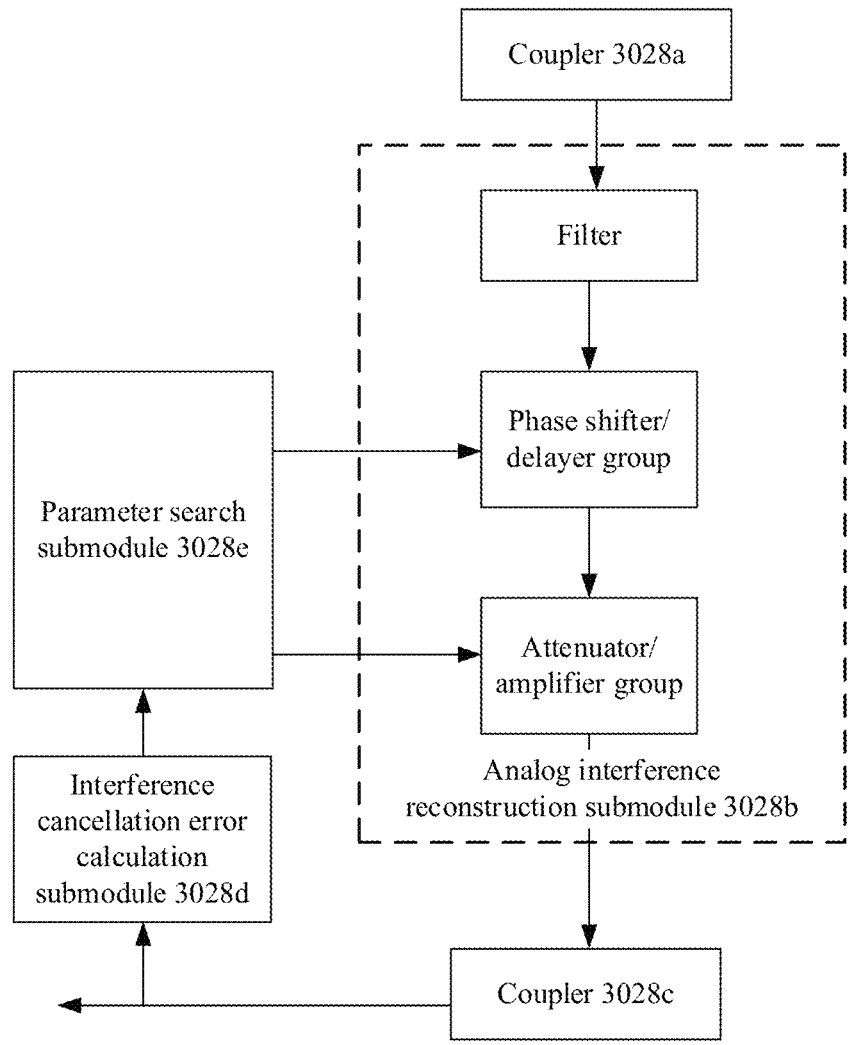
FIG. 14 is a schematic structural diagram of an analog interference reconstruction submodule 3028b according to an embodiment of this application.

For example, in this embodiment of this application, a schematic structural diagram of the analog interference reconstruction submodule 3028b in FIG. 13A and FIG. 13B may be shown in FIG. 14. The analog interference reconstruction submodule 3028b includes a filter, a phase shifter/delayer group, and an attenuator/amplifier group. For connections of the units in the analog interference reconstruction submodule 3028b and connections between the units in the analog interference reconstruction submodule 3028b and each of the parameter search submodule 3028e, the coupler 3028a, and the interference cancellation submodule 3028c, refer to FIG. 14, and details are not described herein.

The filter in the analog interference reconstruction submodule 3028b is configured to filter out a high-frequency carrier. The signal 11 enters the attenuator/amplifier group after passing through the phase shifter/delayer group, and the attenuator/amplifier group outputs the analog cancellation signal of the self-interference noise.

According to the foregoing self-interference noise cancellation method, not only the self-interference noise can be cancelled, but also self-interference of the $f_2$ frequency carrier can be reduced before a second signal enters an ADC 3024, thereby resolving a problem that the ADC 3024 in a receiver is overloaded due to a comparatively strong self-interference signal.

Optionally, in another possible implementation, that the first device reconstructs self-interference noise based on the first transmit signal and a second interference cancellation error reference value, to obtain a cancellation signal of the self-interference noise includes: The first device reconstructs digital self-interference noise based on the first transmit signal and the second interference cancellation error reference value, to obtain a digital cancellation signal of the self-interference noise. Correspondingly, that the first device cancels the self-interference noise from the second receive signal based on the cancellation signal of the self-interference noise includes: The first device cancels the self-interference noise from the second receive signal based on the digital cancellation signal of the self-interference noise.

Figure 15A:
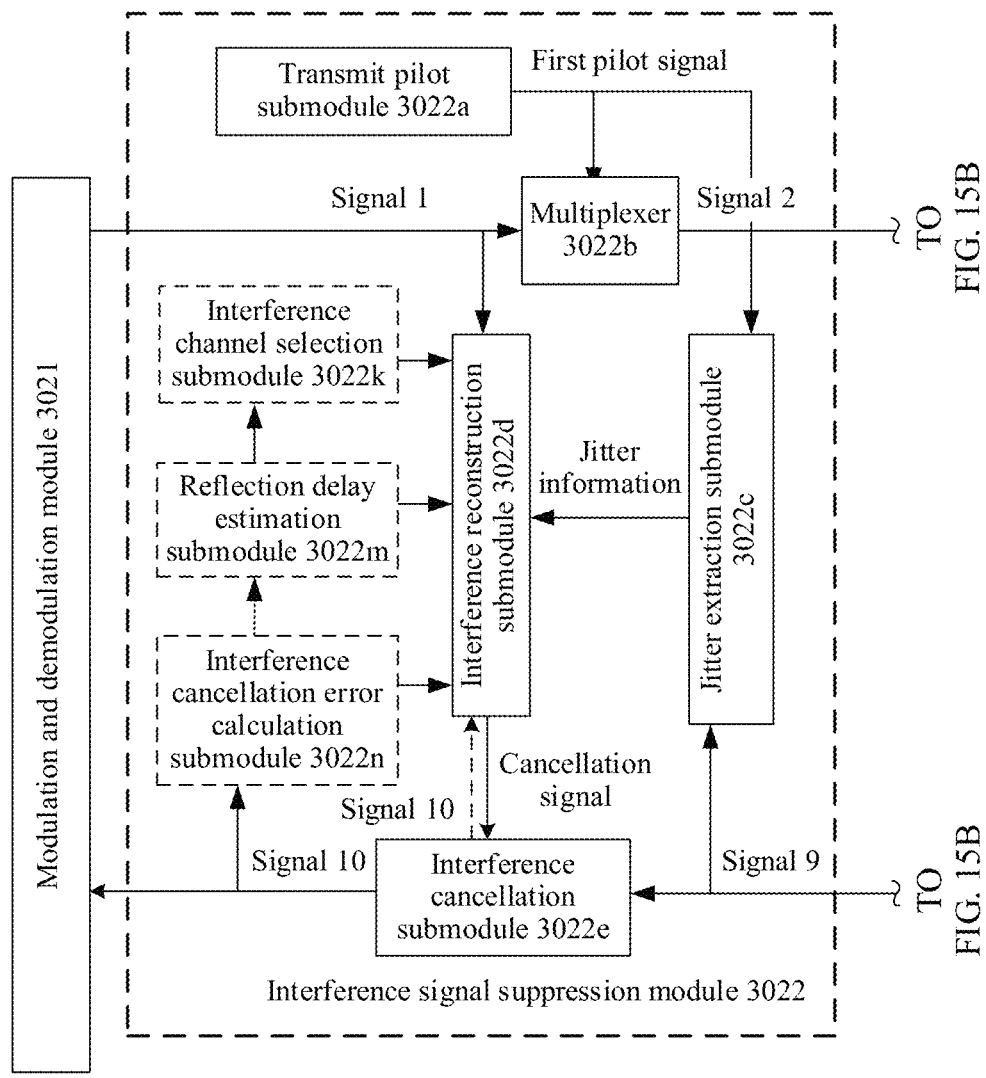
FIG. 15A and FIG. 15B are still another schematic structural diagram of an IDU 302 according to an embodiment of this application.
Figure 15B:
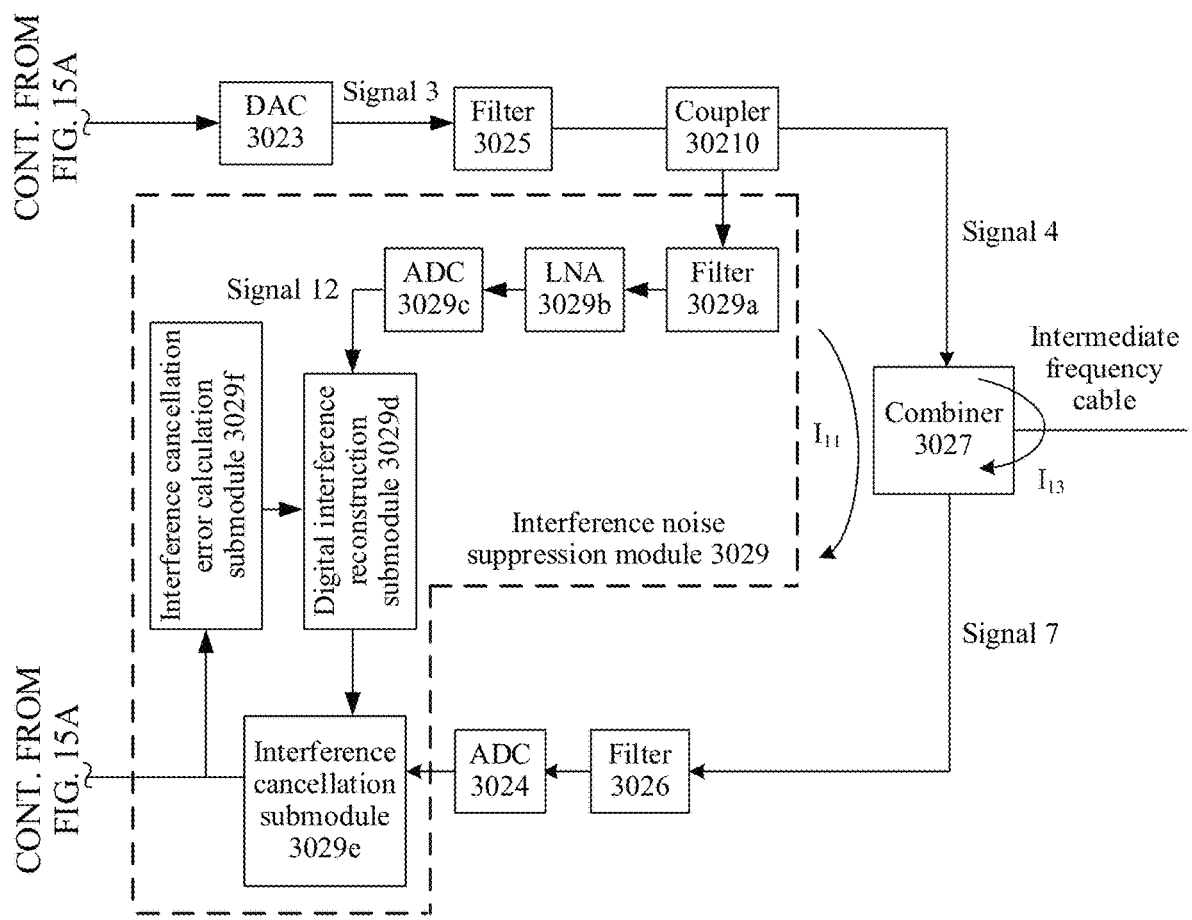

To implement cancellation of the self-interference noise, for example, refer to FIG. 15A and FIG. 15B that are still another schematic structural diagram of an IDU 302 according to an embodiment of this application. Compared with the IDU 302 shown in FIG. 6A and FIG. 6B, this IDU 302 is added with an interference noise suppression module 3029 and a coupler 30210. As shown in FIG. 15A and FIG. 15B, the interference noise suppression module 3029 includes a filter 3029a, a low noise amplifier (LNA) 3029b, an ADC 3029c, a digital interference reconstruction submodule 3029d, an interference cancellation submodule 3029e, and an interference cancellation error calculation submodule 3029f. An output end of a filter 3025 is connected to an input end of the coupler 30210; an output end of the coupler 30210 is separately connected to an input end of the filter 3029a and an input end of a combiner 3027; an output end of the filter 3029a is connected to an input end of the LNA 3029b; an output end of the LNA 3029b is connected to an input end of the ADC 3029c; an output end of the ADC 3029c is connected to an input end of the digital interference reconstruction submodule 3029d; an output end of the digital interference reconstruction submodule 3029d is connected to an input end of the interference cancellation submodule 3029e; an output end of an ADC 3024 is connected to the input end of the interference cancellation submodule 3029e; an output end of the interference cancellation submodule 3029e is separately connected to an input end of the interference cancellation error calculation submodule 3029f, an input end of a jitter extraction submodule 3022c, and an input end of an interference cancellation submodule 3022e; and an output end of the interference cancellation error calculation submodule 3029f is connected to the input end of the digital interference reconstruction submodule 3029d.

Specifically, assuming that a first transmit signal is a signal 1, in FIG. 15A and FIG. 15B, a signal 12 may be obtained after the signal 1 passes through a multiplexer 3022b, a DAC 3023, the filter 3025, the coupler 30210, the filter 3029a, the LNA 3029b, and the ADC 3029c. The coupler 30210 is configured to perform coupling on a signal output by the filter 3025. The filter 3029a is configured to filter a signal output by the coupler 30210. The LNA 3029b is configured to amplify a signal output by the filter 3029a. The ADC 3029c is configured to perform analog-to-digital conversion on a signal output by the LNA 3029b, to obtain a digital signal. In other words, a high-frequency part may be sent to a digital part through the ADC 3029c by using a receive feedback link. Further, the digital interference reconstruction submodule 3029d reconstructs digital self-interference noise based on the signal 12 and the second interference cancellation error reference value, and after obtaining a digital cancellation signal of self-interference noise, sends the digital cancellation signal of the self-interference noise to the interference cancellation submodule 3029e. The interference cancellation submodule 3029e cancels the self-interference noise from a second receive signal based on the digital cancellation signal of the self-interference noise.

In FIG. 15A and FIG. 15B, when the ADC 3029c has a sufficient bit width, a problem of how to cancel bandwidth self-interference noise may be further resolved by using the foregoing self-interference noise cancellation method. In addition, the interference noise suppression module 3029 in FIG. 15A and FIG. 15B may also reduce a self-interference signal on the $f_2$ frequency carrier. This is not specifically limited in this embodiment of this application.

Optionally, in this embodiment of this application, when a transmission distance of an intermediate frequency cable is comparatively long, or a transmitted signal has a larger bandwidth (for example, a special shield layer is used to resolve GSM/LTE interference, so that the interference does not need to be avoided, and a larger bandwidth can be transmitted), a power of a receive signal is comparatively low. In this case, interference signal cancellation may be performed once before the receive signal enters the ADC 3024. In other words, that the first transmit signal generates a first self-interference signal to a receive end of the first device may include: The first transmit signal generates a second self-interference signal to the receive end of the first device, where the second self-interference signal includes the first self-interference signal. Correspondingly, that the first device obtains a second signal may include: The first device obtains a third signal, where the third signal includes the second pilot signal, the second receive signal, and the second self-interference signal; the first device reconstructs a self-interference signal based on the first transmit signal and a third interference cancellation error reference value, to obtain a cancellation signal of the second self-interference signal; and the first device cancels the second self-interference signal from the second receive signal based on the cancellation signal of the second self-interference signal, to obtain the second signal.

In a possible implementation, that the first device reconstructs a self-interference signal based on the first transmit signal and a third interference cancellation error reference value, to obtain a cancellation signal of the second self-interference signal includes: The first device reconstructs a digital self-interference signal based on the first transmit signal and the third interference cancellation error reference value, to obtain a digital cancellation signal of the second self-interference signal; and the first device converts the digital cancellation signal of the second self-interference signal into an analog cancellation signal of the second self-interference signal. Correspondingly, that the first device cancels the second self-interference signal from the second receive signal based on the cancellation signal of the second self-interference signal, to obtain the second signal includes: The first device cancels the second self-interference signal from the second receive signal based on the analog cancellation signal of the second self-interference signal, to obtain an analog signal corresponding to the second signal; and the first device converts the analog signal corresponding to the second signal into the second signal by using an ADC.

Figure 16A:
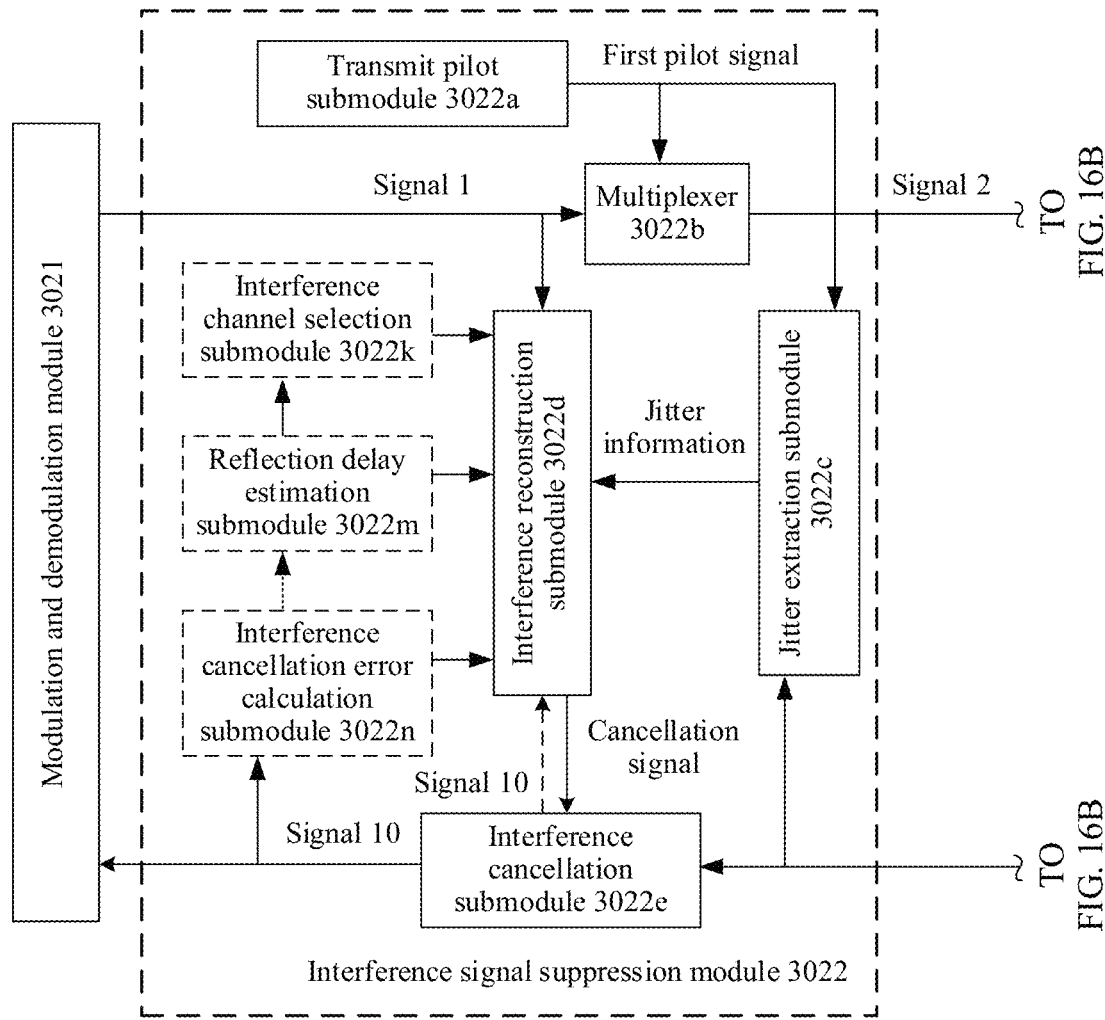
FIG. 16A and FIG. 16B are still another schematic structural diagram of an IDU 302 according to an embodiment of this application.
Figure 16B:
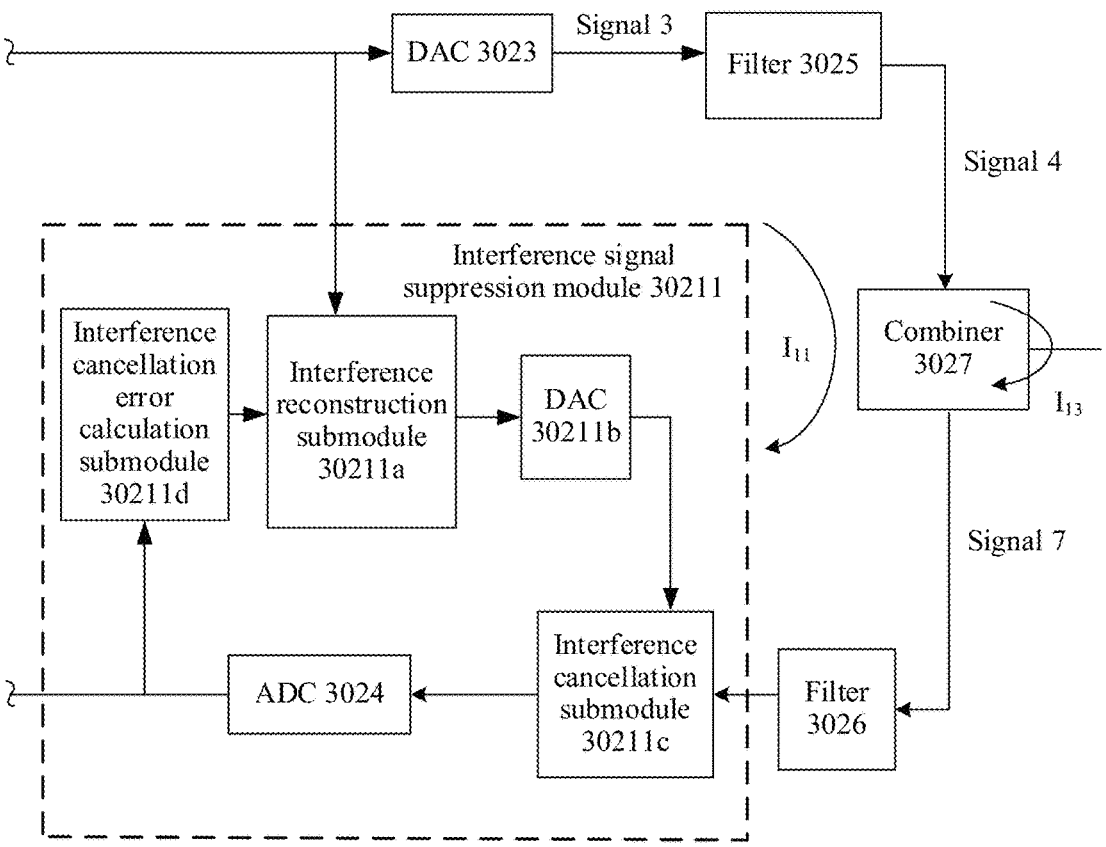

To implement the foregoing function, for example, refer to FIG. 16A and FIG. 16B that are still another schematic structural diagram of an IDU 302 according to an embodiment of this application. Compared with the IDU 302 shown in FIG. 6A and FIG. 6B, this IDU 302 is added with an interference signal suppression module 30211. As shown in FIG. 16A and FIG. 16B, the interference signal suppression module 30211 includes an interference reconstruction submodule 30211a, a DAC 30211b, an interference cancellation submodule 30211c, an interference cancellation error calculation submodule 30211d, and the ADC 3024 in FIG. 6A and FIG. 6B. An output end of a multiplexer 3022b is separately connected to an input end of the interference reconstruction submodule 30211a and an input end of a DAC 3023; an output end of the interference reconstruction submodule 30211a is connected to an input end of the DAC 30211b; an output end of the DAC 30211b is connected to an input end of the interference cancellation submodule 30211c; an output end of the interference cancellation submodule 30211c is connected to an input end of the ADC 3024; and an output end of the ADC 3024 is separately connected to an input end of the interference cancellation error calculation submodule 30211d and an input end of an interference cancellation submodule 3022e.

Specifically, assuming that a first transmit signal is a signal 1, in FIG. 16A and FIG. 16B, a signal 2 may be obtained after the signal 1 passes through the multiplexer 3022b. Further, the interference reconstruction submodule 30211a reconstructs a digital self-interference signal based on the signal 2 and a third interference cancellation error reference value that is output by the interference cancellation error calculation submodule 30211d, to obtain a digital cancellation signal of a second self-interference signal. The DAC 30211b performs digital-to-analog conversion on the digital cancellation signal of the second self-interference signal, to obtain an analog cancellation signal of the second self-interference signal. Further, the interference cancellation submodule 30211c cancels the second self-interference signal from a second receive signal based on the analog cancellation signal of the second self-interference signal, to obtain an analog signal corresponding to a second signal. The ADC 3024 performs analog-to-digital conversion on the analog signal corresponding to the second signal, to obtain the second signal.

In the IDU 302 shown in FIG. 16A and FIG. 16B, cancellation of the second self-interference signal is performed in an analog part, and reconstruction of the second self-interference signal is performed in a digital part. This belongs to digital-analog hybrid interference cancellation. Certainly, the interference signal suppression module 30211 in FIG. 16A and FIG. 16B are merely an example. The interference signal suppression module 30211 may be alternatively designed so that both cancellation of the second self-interference signal and reconstruction of the second self-interference signal are performed in a digital part; the interference signal suppression module 30211 may be alternatively designed so that cancellation of the second self-interference signal is performed in a digital part, and reconstruction of the second self-interference signal is performed in an analog part; or the like. This is not specifically limited in this embodiment of this application.

Based on the foregoing solutions, because interference signal cancellation may be performed once before the receive signal enters the ADC 3024, not only a signal to interference plus noise ratio (SINR) of a received wanted signal existing before the receive signal enters the ADC 3024 can be improved, but also a bit quantity requirement for the ADC 3024 can be reduced.

It should be noted that the foregoing technical solutions in the embodiments of this application may be used individually or in combination in different application scenarios. This is not specifically limited in the embodiments of this application.

All or some of the foregoing embodiments may be implemented by using software, hardware, firmware, or any combination thereof. For example, a function of the interference signal suppression module 3022 in the IDU 302 shown in FIG. 6A and FIG. 6B, FIG. 13A and FIG. 13B, FIG. 15A and FIG. 15B, or FIG. 16A and FIG. 16B, a function of the interference signal suppression module 3012c in the ODU 301 shown in FIG. 6A and FIG. 6B, a function of the interference noise suppression module 3028 in FIG. 13A and FIG. 13B, a function of the interference noise suppression module 3029 in FIG. 15A and FIG. 15B, or a function of the interference signal suppression module 30211 in FIG. 16A and FIG. 16B may be implemented in a hardware manner, or may be implemented in a manner of executing software instructions (which may also be referred to as a software program) by a processor, or may be implemented in a hardware manner in combination with a manner of executing software instructions by a processor. This is not specifically limited in the embodiments of this application.

Optionally, the processor in this embodiment of this application may be a central processing unit (CPU), or an application-specific integrated circuit (ASIC), or may be configured as one or more integrated circuits implementing this embodiment of this application, for example, one or more microprocessors (DSP) or one or more field programmable gate arrays (FPGA).

Optionally, the software instructions in the embodiments of this application may include a corresponding software module. The software module may be stored in a read-only memory (ROM), a random access memory (RAM), an erasable programmable read-only memory (EPROM), an electrically erasable programmable read-only memory (EEPROM), a flash memory, a compact disc read-only memory (CD-ROM), a register, a hard disk, a removable hard disk, optical disc storage (including a compressed optical disc, a laser disc, an optical disc, a digital universal optical disc, a Blu-ray optical disc, and the like), a magnetic disk storage medium, or a storage medium in any other form well known in the art. For example, a storage medium is coupled to the processor, so that the processor can read information from the storage medium and write information into the storage medium. Certainly, the storage medium may alternatively be a component of a processor. This is not specifically limited in the embodiments of this application.

When software instructions are used to implement the embodiments, the embodiments may be implemented completely or partially in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatus.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example description of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An interference cancellation method comprising:
sending, by a first device, a first signal to a second device, wherein the first signal comprises a first transmit signal and a first pilot signal, and sending a first self-interference signal, generated when the first transmit signal is sent to the second device, to a receive end of the first device, where the first transmit signal and the first pilot signal use different frequency bands;
obtaining, by the first device, a second signal comprising the first self-interference signal, a second pilot signal, and a second receive signal from the second device, wherein the second pilot signal is obtained after the first pilot signal undergoes a channel jitter, wherein frequency bands used by the first transmit signal and the second receive signal completely or partially overlap, and wherein the second receive signal and the second pilot signal use different frequency bands;
extracting, by the first device, jitter information of the first self-interference signal based on the first pilot signal and the second pilot signal;
reconstructing, by the first device, a second self-interference signal based on the first transmit signal and the jitter information, to obtain a cancellation signal of the first self-interference signal; and canceling, by the first device, the first self-interference signal from the second receive signal based on the cancellation signal.

2. The method according to claim 1, wherein reconstructing, by the first device, the first self-interference signal comprises:

reconstructing, by the first device, a near-end interference signal based on the first transmit signal and the jitter information, wherein the near-end interference signal comprises a near-end reflected interference signal and a near-end transmit-receive isolated interference signal.

3. The method according to claim 2, wherein reconstructing, by the first device, the first self-interference signal comprises:

determining, by the first device, that X far-end reflected interference signal cancellations need to be performed, wherein X is a positive integer; and reconstructing, by the first device based on the first transmit signal and the jitter information, the near-end interference signal, and a first interference signal resulting from a first far-end reflection to a second interference signal resulting from an $X^{th}$ far-end reflection, wherein the near-end interference signal comprises the near-end reflected interference signal and the near-end transmit-receive isolated interference signal.

4. The method according to claim 3, wherein reconstructing, by the first device based on the first transmit signal and the jitter information, the first interference signal comprises:

reconstructing, by the first device based on the first transmit signal and the jitter information and with reference to X delay parameters, the first interference signal, wherein an $f^{th}$ delay parameter in the X delay parameters is used for reconstruction of a third interference signal resulting from an $f^{th}$ far-end reflection in the first interference signal, and f is a positive integer greater.

5. The method according to claim 3, wherein determining, by the first device, that X far-end reflected interference signal cancellations need to be performed comprises:

obtaining, by the first device, a $k^{th}$ delay parameter and a $(k+1)^{th}$ delay parameter, wherein the $k^{th}$ delay parameter is a third interference signal resulting from a $k^{th}$ far-end reflection, the $(k+1)^{th}$ delay parameter is a fourth interference signal resulting from a $(k+1)^{th}$ far-end reflection, and k is a positive integer;

determining, by the first device based on the $k^{th}$ delay parameter and the $(k+1)^{th}$ delay parameter, a length of an intermediate frequency cable that connects the first device and the second device; and determining, by the first device based on the length of the intermediate frequency cable, that the X far-end reflected interference signal cancellations need to be performed.

6. The method according to claim 1, wherein extracting, by the first device, jitter information comprises:

converting, by the first device, the second pilot signal into a narrowband pilot signal; and extracting, by the first device, the jitter information from the narrowband pilot signal based on the first pilot signal.

7. The method according to claim 1, wherein extracting, by the first device, the jitter information comprises:

converting, by the first device, the second pilot signal into a monophonic pilot signal; and extracting, by the first device, the jitter information from the monophonic pilot signal based on the first pilot signal.

8. The method according to claim 1, wherein the jitter information comprises at least one of phase jitter information of the first self-interference signal or amplitude jitter information of the first self-interference signal.

9. The method according to claim 1, wherein the first transmit signal comprises a first carrier signal and a second carrier signal, and a center frequency of the second carrier signal is higher than a global system for mobile communications (GSM)/long term evolution (LTE) interfering frequency; the second carrier signal generates self-interference noise at the receive end of the first device; the second signal further comprises the self-interference noise; and the method further comprises:

reconstructing, by the first device, the self-interference noise based on the first transmit signal and a second interference cancellation error reference value, to obtain a cancellation signal of the self-interference noise; and canceling, by the first device, the self-interference noise from the second receive signal based on the cancellation signal of the self-interference noise.

10. The method according to claim 9, wherein reconstructing, by the first device, the self-interference noise comprises:

determining, by the first device based on the second interference cancellation error reference value, a reconstruction parameter used for reconstruction of analog self-interference noise; and reconstructing, by the first device, the analog self-interference noise based on the reconstruction parameter and the first transmit signal, to obtain an analog cancellation signal of the self-interference noise; and canceling, by the first device, of the self-interference noise from the second receive signal comprises:

canceling, by the first device, the self-interference noise from the second receive signal based on the analog cancellation signal of the self-interference noise.

11. The method according to claim 9, wherein reconstructing, by the first device, the self-interference noise to obtain the cancellation signal of the self-interference noise comprises:

reconstructing, by the first device, digital self-interference noise based on the first transmit signal and the second interference cancellation error reference value, to obtain a digital cancellation signal of the self-interference noise; and canceling, by the first device, the self-interference noise from the second receive signal comprises:

canceling, by the first device, the self-interference noise from the second receive signal based on the digital cancellation signal of the self-interference noise.

12. The method according to claim 1, wherein the first transmit signal generates the first self-interference signal to the receive end of the first device by generating a third self-interference signal to the receive end of the first device, wherein the third self-interference signal comprises the first self-interference signal; and obtaining, by the first device, the second signal comprises:

obtaining, by the first device, a third signal, wherein the third signal comprises the second pilot signal, the second receive signal, and the third self-interference signal;

reconstructing, by the first device, a fourth self-interference signal based on the first transmit signal and a third interference cancellation error reference value, to obtain a cancellation signal of the third self-interference signal; and canceling, by the first device, the third self-interference signal from the second receive signal based on the cancellation signal of the third self-interference signal, to obtain the second signal.

13. The method according to claim 1, wherein the first device is an indoor unit (IDU), and the second device is an outdoor unit (ODU); or the first device is the ODU, and the second device is the IDU.

14. A first device comprising:
a multiplexer, a jitter extraction submodule, a first interference reconstruction submodule, and a first interference cancellation submodule, wherein
the multiplexer is configured to obtain a first transmit signal and a first pilot signal, multiplex the first transmit signal and the first pilot signal into a first signal, and send the first signal to a second device, and send a first self-interference signal, generated when the first transmit signal is sent to the second device, to a receive end of the first device, where the first transmit signal and the first pilot signal use different frequency bands;
the jitter extraction submodule is configured to obtain the first pilot signal and a second signal, wherein the second signal comprises the first self-interference signal, a second pilot signal, and a second receive signal from the second device, wherein the second pilot signal is obtained after the first pilot signal undergoes a channel jitter, wherein frequency bands used by the first transmit signal and the second receive signal completely or partially overlap, and wherein the second receive signal and the second pilot signal use different frequency bands;
the jitter extraction submodule is further configured to extract jitter information of the first self-interference signal based on the first pilot signal and the second pilot signal;
the first interference reconstruction submodule is configured to obtain the first transmit signal and the jitter information of the first self-interference signal, and reconstruct a second self-interference signal based on the first transmit signal and the jitter information, to obtain a cancellation signal of the first self-interference signal; and
the first interference cancellation submodule is configured to obtain the second signal and the cancellation signal of the first self-interference signal, and cancel the first self-interference signal from the second receive signal based on the cancellation signal.

15. The first device according to claim 14, wherein the first interference reconstruction submodule is further configured to:
reconstruct a near-end interference signal based on the first transmit signal and the jitter information of the first self-interference signal, wherein the near-end interference signal comprises a near-end reflected interference signal and a near-end transmit-receive isolated interference signal.

16. The first device according to claim 14, wherein the first interference reconstruction submodule is further configured to:
determine that X far-end reflected interference signal cancellations need to be performed, wherein X is a positive integer; and
reconstruct, based on the first transmit signal and the jitter information of the first self-interference signal, a near-end interference signal, and an interference signal resulting from the first far-end reflection to an interference signal resulting from an $X^{th}$ far-end reflection, wherein the near-end interference signal comprises a near-end reflected interference signal and a near-end transmit-receive isolated interference signal.

17. The first device according to claim 16, wherein the first interference reconstruction submodule is further configured to:
reconstruct, based on the first transmit signal and the jitter information of the first self-interference signal and with reference to X delay parameters, the interference signal resulting from the first far-end reflection to the interference signal resulting from the $X^{th}$ far-end reflection, wherein an $f^{th}$ delay parameter in the X delay parameters is used for reconstruction of an interference signal resulting from an $f^{th}$ far-end reflection in the interference signal resulting from the first far-end reflection to the interference signal resulting from the $X^{th}$ far-end reflection, and f is a positive integer.

18. The first device according to claim 16, wherein the first interference reconstruction submodule is further configured to:
obtain a $k^{th}$ delay parameter and a $(k+1)^{th}$ delay parameter, wherein the $k^{th}$ delay parameter is of an interference signal resulting from a $k^{th}$ far-end reflection, the $(k+1)^{th}$ delay parameter is of an interference signal resulting from a $(k+1)^{th}$ far-end reflection, and k is a positive integer;
determining, based on the $k^{th}$ delay parameter and the $(k+1)^{th}$ delay parameter, a length of an intermediate frequency cable that connects the first device and the second device; and
determining, based on the length of the intermediate frequency cable, that the X far-end reflected interference signal cancellations need to be performed.

19. The first device according to claim 14, wherein the jitter extraction submodule is further configured to:
convert the second pilot signal into a narrowband pilot signal; and
extract the jitter information of the first self-interference signal from the narrowband pilot signal based on the first pilot signal.

20. A microwave transmission system comprising:
a first device, a second device, and an intermediate frequency cable connecting the first device and the second device, wherein the first device is an indoor unit (IDU), and the second device is an outdoor unit (ODU); or the first device is an ODU, and the second device is an IDU;
the first device is configured to send a first signal to the second device, wherein the first signal comprises a first transmit signal and a first pilot signal, and send a first self-interference signal, generated when the first transmit signal is sent to the second device, to a receive end of the first device, where the first transmit signal and the first pilot signal use different frequency bands;
the second device is configured to send a second receive signal to the first device by using the intermediate frequency cable;
the first device is further configured to obtain a second signal, wherein the second signal comprises the first self-interference signal, a second pilot signal, and the second receive signal from the second device, wherein the second pilot signal is obtained after the first pilot signal undergoes a channel jitter, wherein frequency bands used by the first transmit signal and the second receive signal completely or partially overlap, and wherein the second receive signal and the second pilot signal use different frequency bands;

the first device is further configured to extract jitter information of the first self-interference signal based on the first pilot signal and the second pilot signal;

the first device is further configured to reconstruct a second self-interference signal based on the first transmit signal and the jitter information, to obtain a cancellation signal of the first self-interference signal; and the first device is further configured to cancel the first self-interference signal from the second receive signal based on the cancellation signal.

* * * * *

UNITED STATES PATENT AND TRADEMARK OFFICE
CERTIFICATE OF CORRECTION

| | |
|---|---|
| PATENT NO. | : 11,895,522 B2 |
| APPLICATION NO. | : 17/313531 |
| DATED | : February 6, 2024 |
| INVENTOR(S) | : Meng Cai et al. |

It is certified that error appears in the above-identified patent and that said Letters Patent is hereby corrected as shown below:

In the Claims

In Column 38, Line 36, in Claim 10, after "device," delete "of".

Signed and Sealed this
Twenty-sixth Day of March, 2024

Katherine Kelly Vidal
Director of the United States Patent and Trademark Office